(12) United States Patent  (10) Patent No.: US 9,354,811 B2
Chaudhri  (45) Date of Patent: *May 31, 2016

(54) MULTIFUNCTION DEVICE WITH INTEGRATED SEARCH AND APPLICATION SELECTION

(71) Applicant: Apple Inc., Cupertino, CA (US)

(72) Inventor: Imran Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,975

(22) Filed: Nov. 15, 2013

(65) Prior Publication Data

US 2014/0317578 A1  Oct. 23, 2014

Related U.S. Application Data

(63) Continuation of application No. 12/566,640, filed on Sep. 24, 2009, now Pat. No. 8,589,374.

(60) Provisional application No. 61/210,335, filed on Mar. 16, 2009.

(51) Int. Cl.
*G06F 17/30* (2006.01)
*G06F 3/0488* (2013.01)
(Continued)

(52) U.S. Cl.
CPC .......... *G06F 3/04886* (2013.01); *G06F 3/0482* (2013.01); *G06F 3/0486* (2013.01); *G06F 3/04817* (2013.01); *G06F 3/04883* (2013.01)

(58) Field of Classification Search
USPC .................... 707/706–713; 715/863; 345/173
See application file for complete search history.

(56) References Cited

U.S. PATENT DOCUMENTS 4,868,785 A  9/1989 Jordan et al.
4,914,624 A  4/1990 Dunthorn
(Continued)

FOREIGN PATENT DOCUMENTS

AU  2007283771 A1  4/2008
CN  1695105 A  11/2005
(Continued)

OTHER PUBLICATIONS

Non-Final Office Action received for U.S. Appl. No. 12/242,888, mailed on Jul. 25, 2011, 15 pages.
(Continued)

*Primary Examiner* — Hanh Thai
(74) *Attorney, Agent, or Firm* — Morrison & Foerster LLP

(57) ABSTRACT

In some embodiments, a multifunction device with a touch screen display and a plurality of applications concurrently displays a first plurality of application launch icons in a first area of the touch screen display, detects a first input by a user, and in response to detecting the first input by the user, displays a search input area on the touch screen display. In some embodiments, the device receives search input from the user, performs a search using the search input, and displays a plurality of search results from the search. In some embodiments, the device detects user selection of a first search result in the plurality of search results, and displays information corresponding to the first search result in the corresponding first application. In some embodiments, in response input from the user, the device returns to the search results and repeats this process for one or more applications.

18 Claims, 42 Drawing Sheets

(51) Int. Cl.
*G06F 3/0481* (2013.01)
*G06F 3/0482* (2013.01)
*G06F 3/0486* (2013.01)

(56) References Cited

U.S. PATENT DOCUMENTS

| | | | |
|---|---|---|---|
| 5,155,836 | A | 10/1992 | Jordan et al. |
| 5,331,335 | A | 7/1994 | Iida |
| 5,463,725 | A | 10/1995 | Henckel et al. |
| 5,495,566 | A | 2/1996 | Kwatinetz |
| 5,532,715 | A | 7/1996 | Bates et al. |
| 5,553,225 | A | 9/1996 | Perry |
| 5,592,195 | A | 1/1997 | Misono et al. |
| 5,623,588 | A | 4/1997 | Gould |
| 5,655,094 | A | 8/1997 | Cline et al. |
| 5,745,116 | A | 4/1998 | Pisutha-Arnond |
| 5,844,547 | A | 12/1998 | Minakuchi et al. |
| 5,867,158 | A | 2/1999 | Murasaki et al. |
| 5,924,090 | A | 7/1999 | Krellenstein |
| 6,034,688 | A | 3/2000 | Greenwood et al. |
| 6,057,831 | A | 5/2000 | Harms et al. |
| 6,057,840 | A | 5/2000 | Durrani et al. |
| 6,069,626 | A | 5/2000 | Cline et al. |
| 6,141,018 | A | 10/2000 | Beri et al. |
| 6,147,683 | A | 11/2000 | Martinez et al. |
| 6,181,316 | B1 | 1/2001 | Little et al. |
| 6,195,089 | B1 | 2/2001 | Chaney et al. |
| 6,300,967 | B1 | 10/2001 | Wagner et al. |
| 6,310,610 | B1 | 10/2001 | Beaton et al. |
| 6,330,009 | B1 | 12/2001 | Murasaki et al. |
| 6,333,753 | B1 | 12/2001 | Hinckley |
| 6,366,302 | B1 | 4/2002 | Crosby et al. |
| 6,366,910 | B1 | 4/2002 | Rajaraman et al. |
| 6,385,602 | B1 | 5/2002 | Tso et al. |
| 6,431,439 | B1 | 8/2002 | Suer et al. |
| 6,434,556 | B1 | 8/2002 | Levin et al. |
| 6,489,951 | B1 | 12/2002 | Wong et al. |
| 6,496,857 | B1 | 12/2002 | Dustin et al. |
| 6,567,102 | B2 | 5/2003 | Kung |
| 6,570,594 | B1 | 5/2003 | Wagner |
| 6,580,442 | B1 | 6/2003 | Singh et al. |
| 6,661,409 | B2 | 12/2003 | Demartines et al. |
| 6,690,387 | B2 | 2/2004 | Zimmerman et al. |
| 6,707,449 | B2 | 3/2004 | Hinckley et al. |
| 6,714,221 | B1 | 3/2004 | Christie et al. |
| 6,757,002 | B1 | 6/2004 | Oross et al. |
| 6,809,724 | B1 | 10/2004 | Shiraishi et al. |
| 6,816,174 | B2 | 11/2004 | Tiongson et al. |
| 6,820,237 | B1 | 11/2004 | Abu-Hakima et al. |
| 6,847,977 | B2 | 1/2005 | Abajian |
| 6,907,575 | B2 | 6/2005 | Duarte |
| 6,912,462 | B2 | 6/2005 | Ogaki |
| 6,956,558 | B1 | 10/2005 | Rosenberg et al. |
| 6,972,776 | B2 | 12/2005 | Davis et al. |
| 6,975,306 | B2 | 12/2005 | Hinckley et al. |
| 7,009,599 | B2 | 3/2006 | Pihlaja |
| 7,013,285 | B1 | 3/2006 | Rebane |
| 7,046,230 | B2 | 5/2006 | Zadesky et al. |
| 7,075,512 | B1 | 7/2006 | Fabre et al. |
| 7,102,626 | B2 | 9/2006 | Denny, III |
| 7,152,210 | B1 | 12/2006 | Van Den Hoven et al. |
| 7,154,534 | B2 | 12/2006 | Seki et al. |
| 7,155,048 | B2 | 12/2006 | Ohara |
| 7,181,373 | B2 | 2/2007 | Le Cocq et al. |
| 7,185,088 | B1 | 2/2007 | Joy et al. |
| 7,240,291 | B2 | 7/2007 | Card et al. |
| 7,256,770 | B2 | 8/2007 | Hinckley et al. |
| 7,290,223 | B2 | 10/2007 | Decombe |
| 7,360,174 | B2 | 4/2008 | Grossman et al. |
| 7,411,575 | B2 | 8/2008 | Hill et al. |
| 7,451,152 | B2 | 11/2008 | Kraft et al. |
| 7,469,381 | B2 | 12/2008 | Ording |
| 7,643,006 | B2 | 1/2010 | Hill et al. |
| 7,705,830 | B2 | 4/2010 | Westerman et al. |
| 7,720,845 | B2 | 5/2010 | Stata et al. |
| 7,907,124 | B2 | 3/2011 | Hillis et al. |
| 8,577,417 | B2 | 11/2013 | Lessing |
| 2001/0023436 | A1 | 9/2001 | Srinivasan et al. |
| 2001/0028369 | A1 | 10/2001 | Gallo et al. |
| 2002/0051018 | A1 | 5/2002 | Yeh |
| 2002/0054126 | A1 | 5/2002 | Gamon |
| 2002/0109728 | A1 | 8/2002 | Tiongson et al. |
| 2002/0196238 | A1 | 12/2002 | Tsukada et al. |
| 2003/0058281 | A1 | 3/2003 | Kepros et al. |
| 2003/0063130 | A1 | 4/2003 | Barbieri et al. |
| 2003/0080972 | A1 | 5/2003 | Gerstner |
| 2003/0095135 | A1 | 5/2003 | Kaasila et al. |
| 2003/0095697 | A1 | 5/2003 | Wood et al. |
| 2003/0122787 | A1 | 7/2003 | Zimmerman et al. |
| 2003/0164856 | A1 | 9/2003 | Prager et al. |
| 2003/0184525 | A1 | 10/2003 | Tsai |
| 2004/0002959 | A1 | 1/2004 | Alpert et al. |
| 2004/0021676 | A1 | 2/2004 | Chen et al. |
| 2004/0027398 | A1 | 2/2004 | Jaeger |
| 2004/0080541 | A1 | 4/2004 | Saiga et al. |
| 2004/0085364 | A1 | 5/2004 | Keely et al. |
| 2004/0109025 | A1 | 6/2004 | Hullot et al. |
| 2004/0155888 | A1 | 8/2004 | Padgitt et al. |
| 2004/0177319 | A1 | 9/2004 | Horn |
| 2004/0263486 | A1 | 12/2004 | Seni |
| 2005/0012723 | A1 | 1/2005 | Pallakoff |
| 2005/0022108 | A1 | 1/2005 | Carro et al. |
| 2005/0057524 | A1 | 3/2005 | Hill et al. |
| 2005/0122806 | A1 | 6/2005 | Arakawa et al. |
| 2005/0134578 | A1 | 6/2005 | Chambers et al. |
| 2005/0145807 | A1 | 7/2005 | Lapstun et al. |
| 2005/0168488 | A1 | 8/2005 | Montague |
| 2005/0195373 | A1 | 9/2005 | Feigel et al. |
| 2005/0198588 | A1 | 9/2005 | Lin et al. |
| 2005/0237308 | A1 | 10/2005 | Autio et al. |
| 2005/0262428 | A1 | 11/2005 | Little et al. |
| 2005/0270269 | A1 | 12/2005 | Tokkonen |
| 2005/0275618 | A1 | 12/2005 | Juh et al. |
| 2005/0275636 | A1 | 12/2005 | Dehlin et al. |
| 2006/0001647 | A1 | 1/2006 | Carroll |
| 2006/0004739 | A1 | 1/2006 | Anthony et al. |
| 2006/0010400 | A1 | 1/2006 | Dehlin et al. |
| 2006/0025218 | A1 | 2/2006 | Hotta |
| 2006/0026013 | A1 | 2/2006 | Kraft |
| 2006/0026521 | A1 | 2/2006 | Hotelling et al. |
| 2006/0048073 | A1 | 3/2006 | Jarrett et al. |
| 2006/0055669 | A1 | 3/2006 | Das |
| 2006/0061551 | A1 | 3/2006 | Fateh |
| 2006/0077544 | A1 | 4/2006 | Stark |
| 2006/0082549 | A1 | 4/2006 | Hoshino et al. |
| 2006/0094502 | A1 | 5/2006 | Katayama et al. |
| 2006/0095846 | A1 | 5/2006 | Nurmi |
| 2006/0125803 | A1 | 6/2006 | Westerman et al. |
| 2006/0132440 | A1 | 6/2006 | Safai |
| 2006/0156249 | A1 | 7/2006 | Blythe et al. |
| 2006/0167857 | A1 | 7/2006 | Kraft et al. |
| 2006/0181510 | A1 | 8/2006 | Faith |
| 2006/0187215 | A1 | 8/2006 | Rosenberg et al. |
| 2006/0197753 | A1 | 9/2006 | Hotelling |
| 2006/0221858 | A1 | 10/2006 | Switzer et al. |
| 2006/0238495 | A1 | 10/2006 | Davis |
| 2007/0008066 | A1 | 1/2007 | Fukuda |
| 2007/0024646 | A1 | 2/2007 | Saarinen et al. |
| 2007/0046646 | A1 | 3/2007 | Kwon et al. |
| 2007/0058047 | A1 | 3/2007 | Henty |
| 2007/0067726 | A1 | 3/2007 | Flynt et al. |
| 2007/0067745 | A1 | 3/2007 | Choi et al. |
| 2007/0091075 | A1 | 4/2007 | Lii |
| 2007/0109275 | A1 | 5/2007 | Chuang |
| 2007/0120832 | A1 | 5/2007 | Saarinen et al. |
| 2007/0120835 | A1 | 5/2007 | Sato |
| 2007/0125860 | A1 | 6/2007 | Lapstun et al. |
| 2007/0130541 | A1 | 6/2007 | Louch et al. |
| 2007/0150826 | A1 | 6/2007 | Anzures et al. |
| 2007/0150842 | A1 | 6/2007 | Chaudhri et al. |
| 2007/0152978 | A1 | 7/2007 | Kocienda et al. |
| 2007/0152979 | A1 | 7/2007 | Jobs et al. |
| 2007/0155434 | A1 | 7/2007 | Jobs et al. |
| 2007/0156364 | A1 | 7/2007 | Rothkopf |

(56) References Cited

U.S. PATENT DOCUMENTS

| | | |
|---|---|---|
| 2007/0205988 A1 | 9/2007 | Gloyd et al. |
| 2007/0205989 A1 | 9/2007 | Gloyd et al. |
| 2007/0205990 A1 | 9/2007 | Gloyd et al. |
| 2007/0205991 A1 | 9/2007 | Gloyd et al. |
| 2007/0205992 A1 | 9/2007 | Gloyd et al. |
| 2007/0205993 A1 | 9/2007 | Gloyd et al. |
| 2007/0262964 A1 | 11/2007 | Zotov et al. |
| 2008/0001924 A1* | 1/2008 | de los Reyes ....... G06F 3/04886 345/173 |
| 2008/0022215 A1 | 1/2008 | Lee et al. |
| 2008/0024958 A1 | 1/2008 | Mudd et al. |
| 2008/0091635 A1 | 4/2008 | James et al. |
| 2008/0104535 A1 | 5/2008 | Deline et al. |
| 2008/0104544 A1 | 5/2008 | Collins et al. |
| 2008/0134030 A1 | 6/2008 | Kansal et al. |
| 2008/0155464 A1 | 6/2008 | Jones et al. |
| 2008/0158261 A1 | 7/2008 | Gould |
| 2008/0168382 A1 | 7/2008 | Louch et al. |
| 2008/0174570 A1 | 7/2008 | Jobs et al. |
| 2008/0184116 A1 | 7/2008 | Error |
| 2008/0229240 A1 | 9/2008 | Garbow et al. |
| 2008/0250107 A1 | 10/2008 | Holzer et al. |
| 2008/0282158 A1 | 11/2008 | Aaltonen et al. |
| 2008/0320419 A1 | 12/2008 | Matas et al. |
| 2009/0005123 A1 | 1/2009 | Lessing |
| 2009/0006328 A1 | 1/2009 | Lindberg et al. |
| 2009/0007017 A1* | 1/2009 | Anzures ............. G06F 3/04883 715/835 |
| 2009/0055768 A1 | 2/2009 | Chaudhri et al. |
| 2009/0128504 A1* | 5/2009 | Smith ................. G06F 3/04883 345/173 |
| 2009/0178007 A1 | 7/2009 | Matas et al. |
| 2009/0178008 A1* | 7/2009 | Herz ................... G06F 3/04817 715/840 |
| 2009/0228825 A1 | 9/2009 | Van Os et al. |
| 2009/0259969 A1 | 10/2009 | Pallakoff |
| 2009/0284478 A1 | 11/2009 | De La Torre Baltierra et al. |
| 2010/0153881 A1 | 6/2010 | Dinn |
| 2011/0181719 A1 | 7/2011 | Takanezawa et al. |
| 2012/0274597 A1* | 11/2012 | Forstall et al. ................. 345/173 |
| 2012/0311478 A1* | 12/2012 | van Os .................. G06F 3/0488 715/780 |
| 2012/0311499 A1* | 12/2012 | Dellinger ........... H04N 5/23206 715/835 |

FOREIGN PATENT DOCUMENTS

| | | |
|---|---|---|
| EP | 0635779 A1 | 1/1995 |
| EP | 0701220 A1 | 3/1996 |
| EP | 0880091 A2 | 11/1998 |
| EP | 2069877 | 6/2009 |
| JP | 2-140822 A | 5/1990 |
| JP | 3-271976 A | 12/1991 |
| JP | 7-230352 A | 8/1995 |
| JP | 10-240220 A | 9/1998 |
| JP | 11-327733 A | 11/1999 |
| JP | 2000-163031 A | 6/2000 |
| JP | 2001-290585 A | 10/2001 |
| JP | 2003-140802 A | 5/2003 |
| JP | 2003-288151 A | 10/2003 |
| JP | 2003-344059 A | 12/2003 |
| JP | 2005-284726 A | 10/2005 |
| KR | 2001-0040410 A | 5/2001 |
| KR | 10-2006-0014874 A | 2/2006 |
| KR | 10-2006-0085850 A | 7/2006 |
| WO | 98/48551 A2 | 10/1998 |
| WO | 0201338 A1 | 1/2002 |
| WO | 03/060622 A2 | 7/2003 |
| WO | 03/081458 A1 | 10/2003 |
| WO | 2005/052773 A2 | 6/2005 |
| WO | 2006/003591 A2 | 1/2006 |
| WO | 2006/020305 A2 | 2/2006 |
| WO | 2006/045530 A2 | 5/2006 |

OTHER PUBLICATIONS

Notice of Allowance received for U.S. Appl. No. 12/242,888, mailed on Apr. 17, 2012, 9 pages.

Notice of Allowance received for U.S. Appl. No. 12/242,888, mailed on Mar. 7, 2012, 9 pages.

Notice of Allowance received for U.S. Appl. No. 12/242,888, mailed on Nov. 28, 2011, 10 pages.

Final Office Action received for U.S. Appl. No. 12/566,640, mailed on Jan. 3, 2013, 12 pages.

Non-Final Office Action received for U.S. Appl. No. 12/566,640, mailed on Apr. 30, 2012, 12 pages.

Notice of Allowance received for U.S. Appl. No. 12/566,640, mailed on Apr. 17, 2013, 10 pages.

Notice of Allowance received for U.S. Appl. No. 12/566,640, mailed on Jul. 22, 2013, 9 pages.

Cheng et al., "Navigation Control and Gesture Recognition Input Device for Small, Portable User Interfaces", Synaptics Inc., 2004, pp. 1-13.

Hardy, Ed, "Apple Adds iTunes Wi-Fi Music Store to iPhone", Brighthand, available online at <http://www.brighthand.com/printArticle.asp?newsID=13379>, Sep. 28, 2007, 1 page.

IPhone Hacks, "iPhone Hackers bring Contact and Calendar Search to iPhone", Available online at <http://www.iphonehacks.com/2007/11/search-iphone.html>, Nov. 1, 2007.

PCWorld, "Apple Puts Wi-Fi in iPod Touch, Revamps Other iPods", Available online at <http://www.pcworld.com/printable/article/id,136850/printable.html>, Sep. 5, 2007.

PCWorld, "iPhone Fixes We Want to See", Available online at <http://www.pcworld.com/printable/article/id,135317/printable.html>, Jul. 31, 2007.

Polar Bear Farm, "About PBF Search", Available online at <http://www.polarbearfarm.com/About_PBF_%22Search%22.html>.

Rose, Michael, "Show Floor Video: Polar Bear Farm Demos iPhone Search Utility", Available online at <http://www.tuaw.com/2008/01/18/show-floor-video-polar-bear-farm-demos-iphone-search-utility/>, Jan. 18, 2008.

Zataangstuff, "QuickGold", Available online at <http://web.archive.org/web/20090303133841/http://code.google.com/p/zataangstuff/wiki/QuickGold>, Nov. 23, 2008, 14 pages.

"Microsoft Word 2003 Screenshots", 1983-2003, 2 pages.

Office Action received for European Patent Application No. 08705751.9, mailed on Dec. 28, 2009, 4 pages.

Summons to Attend Oral Proceedings received for European Patent Application No. 08705751.9, mailed on Oct. 28, 2011, 9 pages.

Decision to Grant received for European Patent Application No. 08713567.9, mailed on Oct. 7, 2011, 1 page.

Office Action received for European Patent Application No. 08713567.9, mailed on Dec. 29, 2009, 5 pages.

Certificate of Grant received for Hong Kong Patent Application No. 10103983.1, mailed on Feb. 3, 2012, 5 pages.

Office Action received for Korean Patent Application No. 10-2009-7003574, mailed on Aug. 27, 2009, 1 page (English Translation only).

Notice of Allowance received for Korean Patent Application No. 10-2009-7007114, mailed on Apr. 26, 2013, 2 pages (Offical Copy only).

Office Action received for Korean Patent Application No. 10-2013-7000337, mailed on Jun. 25, 2013, 7 pages (3 pages of English Translation and 4 pages of Official Copy).

Examiner's Amendment received for U.S. Appl. No. 11/956,969, mailed on Oct. 29, 2008, 6 pages.

Notice of Allowance received for U.S. Appl. No. 11/956,969, mailed on Oct. 29, 2008, 6 pages.

Final Office Action received for U.S. Appl. No. 11/968,059, mailed on Oct. 31, 2011, 30 pages.

Non-Final Office Action received for U.S. Appl. No. 11/968,059, mailed on Apr. 4, 2011, 46 pages.

Notice of Allowance received for U.S. Appl. No. 11/968,059, mailed on Mar. 14, 2012, 21 pages.

(56) References Cited

OTHER PUBLICATIONS

Extended European Search Report (includes Partial European Search Report and European Search Opinion) received for European Patent Application No. 11182954.5, mailed on Nov. 29, 2011, 6 pages.
Extended European Search Report (includes Parial European Search Report and European Search Opinion) recieved for the European Patent Application No. 11182959.4, mailed on Nov. 30, 2011, 7 pages.
Extended European Search Report (includes Partial European Search Report and European Search Opinion) received for European Patent Application No. 11182962.8, mailed on Dec. 1, 2011, 8 pages.
Extended European Search Report (includes Partial European Search Report and European Search Opinion) received for European Patent Application No. 11182963.6, mailed on Dec. 1, 2011, 7 pages.
Office Action received for German Patent Application No. 112008000144.8, mailed on Oct. 29, 2010, 8 pages (4 pages of English translation and 4 pages of Official Copy).
Non-Final Office Action received for U.S. Appl. No. 12/270,805, mailed on Oct. 11, 2011, 27 pages.
Non-Final Office Action received for U.S. Appl. No. 12/270,807, mailed on Oct. 11, 2011, 26 pages.
Non-Final Office Action received for U.S. Appl. No. 12/270,810, mailed on Oct. 12, 2011, 12 pages.
Non-Final Office Action received for U.S. Appl. No. 12/270,812, mailed on Oct. 13, 2011, 12 pages.
Non-Final Office Action received for U.S. Appl. No. 12/270,815, mailed on Oct. 11, 2011, 12 pages.
Final Office Action received for U.S. Appl. No. 13/493,963, mailed on May 12, 2015, 16 pages.
Non-Final Office Action received for U.S. Appl. No. 13/493,963 mailed on Aug. 28, 2014, 12 pages.
Office Action received for Australian Patent Application No. 2008100283, mailed on Jul. 1, 2008, 2 pages.
Office Action received for Australian Patent Application No. 2008201540, mailed on Feb. 19, 2009, 2 pages.
Office Action received for Australian Patent Application No. 2008201540, mailed on Jul. 15, 2009, 2 pages.
Office Action received for Chinese Patent Application No. 200880000019.9, mailed on Feb. 18, 2013, 23 pages (12 pages of English Translation and 11 pages of Official Copy).
Office Action received for Chinese Patent Application No. 200880000019.9, mailed on Jan. 5, 2012, 14 pages (English Translation only).
Office Action received for Chinese Patent Application No. 200880000019.9, mailed on Nov. 23, 2010, 13 pages (English Translation only).
Office Action received for Chinese Patent Application No. 200880000019.9, mailed on Sep. 20, 2012, 22 pages (13 pages of English Translation and 9 pages of Official copy).
Office Action received for Australian Patent Application No. 2009200366, mailed on Feb. 11, 2009, 2 pages.
Notice of Acceptance received for Australian Patent Application No. 2009208099, mailed on Nov. 24, 2011, 3 pages.
Notice of Acceptance received for Australian Patent Application No. 2009208103, mailed on Apr. 14, 2011, 3 pages.
Office Action received for Australian Patent Application No. 2009208103, mailed on Apr. 8, 2010, 2 pages.
Decision to Grant received for Japanese Patent Application No. 2009-544996, mailed on May 20, 2011, 1 page (English Translation only).
Office Action received for Japanese Patent Application No. 2009-544996, mailed on Feb. 12, 2010, 1 page (English Translation only).
Office Action received for Japanese Patent Application No. 2009-544996, mailed on Nov. 8, 2010, 6 pages (English Translation only).
Decision to Grant received for Japanese Patent Application No. 2010-157302, mailed on Oct. 26, 2012, 3 pages.
Decision to Grant received for Japanese Patent Application No. 2010-157303, mailed on Apr. 15, 2013, 3 pages (Official Copy only).
Office Action received for Japanese Patent Application No. 2010-157303, mailed on Oct. 15, 2012, 4 pages (2 pages of English Translation and 2 pages of Official copy).

Notice of Acceptance received for Australian Patent Application No. 2011201639, mailed on Nov. 9, 2011, 3 pages.
Certification of Examination received for Australian Patent Application No. 2012100050, mailed on Mar. 2, 2012, 3 pages.
Certificate of Grant received for Turkish part of European Patent Application No. 2126678, mailed on Jun. 21, 2012, 2 pages (Official Copy only).
Notice of Allowance received for Canadian Patent Application No. 2,658,177, mailed on Jan. 30, 2012, 1 page.
Office Action received for Canadian Patent Application No. 2,658,177, mailed on Dec. 1, 2009, 2 pages.
Office Action received for Canadian Patent Application No. 2,658,177, mailed on Jun. 22, 2011, 2 pages.
Ask.com, "A Taxonomy of See-through Tools", available at "http://www.ask.com/web?qsrc=2990&o=0&1=dir& q=A+Taxonomy+of+See-through+Tools", retrieved on Mar. 13, 2011, 2 pages.
Ask.com, "Hide Scroll Bar Touch Screen", available at "http://www.ask.com/web?q=hide+scroll+bar+touch+screen&qsrc=2990& frstpgo=0&o=0&1 . . . ", retrieved on Mar. 9, 2011, 2 pages.
Ask.om, "Pop Up Scroll Bar Touch Screen", available at "http://www.ask.com/web?qsrc=2990&o=0&1=dir& q=pop+Up+scroll+bar+touch+screen", retrieved on Mar. 9, 2011, 3 pages.
Ask.com, "Popup Scroll Bar", available at "http://www.ask.com/web?q=popup+scroll+bar&qsrc=0&o=0&1=dir", retrieved on Mar. 9, 2011, 2 pages.
Ask.com, "Popup Scroll Bar Touch Screen", available at "http://www.ask.com/web?qsrc=2990&o=0&1=dir &q=popup+scroll+bar+touch+screen", retrieved on Mar. 9, 2011, 2 pages.
Ask.com, "Rd 453161 IBM Technical Disclosure", available at "http://www.ask.com/web?qsrc=1&o=0&1=dir&q=rd + 453161+ibm+technical+disclosure", retrieved on Oct. 16, 2011, 1 page.
Ask.com, "Shorten Scroll Bar", available at "http://www.ask.com/web?q=shorten+scroll+bar&qsrc=0&o=0&1=dir", retrieved on Feb. 21, 2012, 1 page.
Ask.com, "Shorten Scroll Slider", available at "http://www.ask.com/web?qsrc=1&o=0&1=dir&q=shorten+scroll+slider", retrieved on Feb. 21, 2012, 2 pages.
Ask.com, "Shorten Scroll Thumb", available at "http://www.ask.com/web?q=shorten+scroll+thumb&qsrc=1&o=0&1=dir& qid=0E97B1726 . . . ", retrieved on Feb. 21, 2012, 1 page.
Ask.com, "Smaller Scroll (Slider or Thumb or Bar)", available at "http://www.ask.com/web?qsrc=1&o=0&1=dir& q=smaller+scroll+%28slider+or+thumb+or . . . ", retrieved on Feb. 21, 2012, 2 pages.
Ask.com, "The Design of a GUI Paradigm Based on Tablets, Two-Hands", available at "http://www.ask.com/web?q=The+Design+of+a+GUI+Paradigm+based+on+Tablets%2C+. . .", retrieved on Mar. 13, 2011, 2 pages.
Ask.com, "Toolglass and Magic Lenses: The See-through Interface", available at "http://www.ask.com/web?qsrc=2990&o=0&1=dir& q=Toolglass+and+Magic+Lenses%3A . . . ", retrieved on Mar. 13, 2011, 2 pages.
Bederson et al., "PhotoMesa 3.1.2 Screen Shots", 2004-2006, 5 pages.
Conneally, Tim, "Apple Secures a Patent for a Multitouch Methology", available at "http://www.betanews.com/article/Apple-secures-a-patent-for-a-multitouch-methodology/1233074799", Jan. 27, 2009, 1 page.
Dewid, R D., "Scroll Control Box", IBM Technical Disclosure Bulletin, vol. 36, No. 4, Apr. 1993, pp. 399-403.
Ebscohost, "Scroll Bar", available at "http://ehis.ebscohost.com/ehost/resultsadvanced?sid=b815aec7-bd4d-46b8-badf-5e23 3888 . . . ", retrieved on Feb. 21, 2012, 4 pages.
Ebscohost, "Scroll Slider", available at "http://ehis.ebscohost.com/ehost/resultsadvanced?sid=b815aec7-bd4d-46b8-badf-5e233 888 . . . ", retrieved on Feb. 21, 2012, 4 pages.
Ebscohost, "Scroll Thumb", available at "http://ehis.ebscohost.com/ehost/resultsadvanced?sid=b815aec7-bd4d-46b8-badf-5e233 888 . . . ", retrieved on Feb. 21, 2012, 1 page.

(56) References Cited

OTHER PUBLICATIONS

Ebscohost, "Shorten Scroll (Bar or Thumb or Slider)", available at "http://ehis.ebscohost.com/ehost/resultsadvanced?sid=b815aec7-bd4d-46b8-badf-5e233888...", retrieved on Feb. 21, 2012, 4 pages.

IBM, "Method for Providing Position Relative Audio Feedback in a Scrollable Content Area", IBM Research Disclosure RD 418078, Feb. 1999, 2 pages.

IBM, "Responsive Scrollbar for Handheld Devices", IBM Research Disclosure RD 453161, Jan. 2002, 4 pages.

Kurtenbach et al., "The Design of a GUI Paradigm Based on Tablets, Two-Hands, and Transparency", Mar. 27, 1997, 8 pages.

Miller, Dana, "PersonalJava Application Environment", available at "http://java.sun.com/products/personaljava/touchable/", Jun. 8, 1999, 12 pages.

International Search Report and Written Opinion received for PCT Patent Application No. PCT/US2008/050292, mailed on Sep. 19, 2008, 19 pages.

Invitation to Pay Additional Fees received for PCT Patent Application No. PCT/US2008/050292, mailed on Jul. 18, 2008, 4 pages.

Safari Books Online, "Shorten Scroll Slider", available at "http://academic.safaribooksonline.com/search/shorten+scroll+slider", retrieved on Feb. 21, 2012, 2 pages.

Safari Books Online, "Shorten Scroll Thumb", available at "http://academic.safaribooksonline.com/search/shorten+scroll+thumb", retrieved on Feb. 21, 2012, 1 page.

Safari Books Online, "Shorten Scrollbar", available at "http://academic.safaribooksonline.com/search/shorten+scrollbar", retrieved on Feb. 21, 2012, 3 pages.

Tidwell, Jenifer, "Magnetism", Designing Interfaces, 2006, pp. 261-262.

UG3GENKI, "Steve Jobs—2007 iPhone Presentation (Part 1 of 2)", available at "http//www.youtube.com/watch?v=6uW-E496FXg", 2007, 1 page.

* cited by examiner

MULTIFUNCTION DEVICE WITH INTEGRATED SEARCH AND APPLICATION SELECTION

RELATED APPLICATIONS

This application is a continuation of U.S. application Ser. No. 12/566,640, filed Sep. 24, 2009, which claims priority to U.S. Provisional Patent Application No. 61/210,335, "Multifunction Device with Integrated Search and Application Selection," filed Mar. 16, 2009, which are incorporated by reference herein in their entirety.

TECHNICAL FIELD

The disclosed embodiments relate generally to electronic devices with touch-sensitive surfaces operable to access multiple applications and perform searches over information associated with those applications.

BACKGROUND

The use of touch-sensitive surfaces as input devices for computers and other electronic computing devices has increased significantly in recent years. Exemplary touch-sensitive surfaces include touch pads and touch screen displays. Electronic computing devices such as portable multifunction devices often contain information associated with a plurality of applications. Users of portable multifunction devices often use search functions to find information on the portable multifunction device. For example, a user may need to find information on a contact, including the phone number of the contact and an appointment with the contact and any documents associated with the contact. Once the user has received results that correspond to the search, the user often wants full access to the application that is associated with a search result, and then often wants to return to the search results.

But conventional methods for performing these searches are cumbersome and inefficient. For example, using a search that requires the user to separately perform a search for each application is tedious and creates a significant cognitive burden on a user. Similarly, using a search that does not provide the user with full access to the application when the user selects a result or does not allow the user to easily return to the list of results is also tedious and creates a significant cognitive burden on a user. In addition, conventional methods take longer than necessary, thereby wasting energy. This latter consideration is particularly important in battery-operated devices.

Accordingly, there is a need for multifunction devices with faster, more efficient methods and interfaces for search. Such methods and interfaces reduce the cognitive burden on a user and produce a more efficient human-machine interface. For battery-operated multifunction devices, such methods and interfaces conserve power and increase the time between battery charges.

SUMMARY

The above deficiencies and other problems associated with user interfaces for multifunction devices with touch-sensitive surfaces are reduced or eliminated by the disclosed devices. In some embodiments, the device is a desktop computer. In some embodiments, the device is portable (e.g., a notebook computer or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. The method includes: concurrently displaying a first plurality of application launch icons in a first area of the touch screen display; detecting a first input by a user; in response to detecting the first input by the user, displaying a search input area on the touch screen display; receiving search input from the user; displaying the search input on the touch screen display; performing a search using the search input; displaying a plurality of search results from the search on the touch screen display; detecting user selection of a first search result in the plurality of search results, wherein the first search result corresponds to content associated with a first application; in response to detecting user selection of the first search result in the plurality of search results: ceasing to display of the plurality of search results, and displaying information corresponding to the first search result in the corresponding first application; while continuing to display the first application, detecting a second input by the user in response to detecting the second input by the user: ceasing to display the first application, and redisplaying the plurality of search results on the touch screen display; detecting user selection of a second search result in the plurality of search results, wherein the second search result corresponds to content associated with a second application, the second search result is other than the first search result, and the second application is other than the first application; in response to detecting user selection of the second search result in the plurality of search results: ceasing to display of the plurality of search results, and displaying information corresponding to the second search result in the corresponding second application; while continuing to display the second application, detecting a third input by the user in response to detecting the third input by the user: ceasing to display the second application, and redisplaying the plurality of search results on the touch screen display.

In accordance with some embodiments, a multifunction device includes a touch-sensitive surface, a display, one or more processors, memory, and one or more programs. The one or more programs are stored in the memory and configured to be executed by the one or more processors. The one or more programs include instructions for: concurrently displaying a first plurality of application launch icons in a first area of the touch screen display; detecting a first input by a user; in response to detecting the first input by the user, displaying a search input area on the touch screen display; receiving search input from the user; displaying the search input on the touch screen display; performing a search using the search input; displaying a plurality of search results from the search on the touch screen display; detecting user selection of a first search result in the plurality of search results, wherein the first search result corresponds to content associated with a first application; in response to detecting user selection of the first search result in the plurality of search results: ceasing to display of the plurality of search results, and displaying information corresponding to the first search result in the corresponding first application; while continuing to display the first application, detecting a second input by the user in response to detecting the second input by the user: ceasing to display the first application, and redisplaying the plurality of search results on the touch screen display; detecting user selection of a second search result in the plurality of search results, wherein the second search result corresponds to content associated with a second application, the second search result is other than the first search result, and the second application is other than the first application; in response to detecting user selection of the second search result in the plurality of search results: ceasing to display of the plurality of search results, and displaying information corresponding to the second search result in the corresponding second application; while continuing to display the second application, detecting a third input by the user: in response to detecting the third input by the user: ceasing to display the second application, and redisplaying the plurality of search results on the touch screen display.

In accordance with some embodiments, a computer readable storage medium has stored therein instructions which when executed by a multifunction device with a touch-sensitive surface and a display, cause the device to: concurrently display a first plurality of application launch icons in a first area of the touch screen display; detect a first input by a user; in response to detecting the first input by the user, display a search input area on the touch screen display; receive search input from the user; display the search input on the touch screen display; perform a search using the search input; display a plurality of search results from the search on the touch screen display; detect user selection of a first search result in the plurality of search results, wherein the first search result corresponds to content associated with a first application; in response to detecting user selection of the first search result in the plurality of search results: cease to display of the plurality of search results, and display information corresponding to the first search result in the corresponding first application; while continuing to display the first application, detect a second input by the user in response to detecting the second input by the user: cease to display the first application, and redisplay the plurality of search results on the touch screen display; detect user selection of a second search result in the plurality of search results, wherein the second search result corresponds to content associated with a second application, the second search result is other than the first search result, and the second application is other than the first application; in response to detecting user selection of the second search result in the plurality of search results: cease to display of the plurality of search results, and display information corresponding to the second search result in the corresponding second application; while continuing to display the second application, detect a third input by the user: in response to detecting the third input by the user: cease to display the second application, and redisplay the plurality of search results on the touch screen display.

In accordance with some embodiments, a graphical user interface on a multifunction device with a touch-sensitive surface, a display, a memory, and one or more processors to execute one or more programs stored in the memory includes a search input area; a plurality of applications; and a plurality of application icons wherein: a first input by a user is detected; in response to detecting the first input by the user, the search input area is displayed on the touch screen display; search input is received from the user; the search input is displayed on the touch screen display; perform a search using the search input; a plurality of search results from the search on the touch screen display are displayed; user selection of a first search result in the plurality of search results is detected, wherein the first search result corresponds to content associated with a first application; in response to detecting user selection of the first search result in the plurality of search results: display of the plurality of search results is ceased, and information corresponding to the first search result in the corresponding first application is displayed; while continuing to display the first application, a second input by the user is detected: in response to detecting the second input by the user: display of the first application is ceased, and the plurality of search results on the touch screen display are redisplayed; user selection of a second search result in the plurality of search results is detected, wherein the second search result corresponds to content associated with a second application, the second search result is other than the first search result, and the second application is other than the first application; in response to detecting user selection of the second search result in the plurality of search results: display of the plurality of search results is ceased, and information corresponding to the second search result in the corresponding second application is displayed; while continuing to display the second application, a third input by the user us detected: in response to detecting the third input by the user: display of the second application is ceased, and the plurality of search results on the touch screen display is redisplayed.

In accordance with some embodiments, a multifunction device includes: a touch-sensitive surface; a display; means for concurrently displaying a first plurality of application launch icons in a first area of the touch screen display; means for detecting a first input by a user; means for, in response to detecting the first input by the user, displaying a search input area on the touch screen display; means for receiving search input from the user; means for displaying the search input on the touch screen display; means for performing a search using the search input; means for displaying a plurality of search results from the search on the touch screen display; means for detecting user selection of a first search result in the plurality of search results, wherein the first search result corresponds to content associated with a first application; in response to detecting user selection of the first search result in the plurality of search results: means for ceasing to display of the plurality of search results, and means for displaying information corresponding to the first search result in the corresponding first application; means for, while continuing to display the first application, detecting a second input by the user in response to detecting the second input by the user: means for ceasing to display the first application, and means for redisplaying the plurality of search results on the touch screen display; means for detecting user selection of a second search result in the plurality of search results, wherein the second search result corresponds to content associated with a second application, the second search result is other than the first search result, and the second application is other than the first application; in response to detecting user selection of the second search result in the plurality of search results: means for ceasing to display of the plurality of search results, and means for displaying information corresponding to the second search result in the corresponding second application; means for, while continuing to display the second application, detecting a third input by the user: in response to detecting the third input by the user: means for ceasing to display the second application, and means for redisplaying the plurality of search results on the touch screen display.

Thus, multifunction devices with touch-sensitive surfaces are provided with faster, more efficient methods and interfaces operable to perform integrated searches and provide access to a plurality of applications, thereby increasing the effectiveness, efficiency, and user satisfaction with such devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
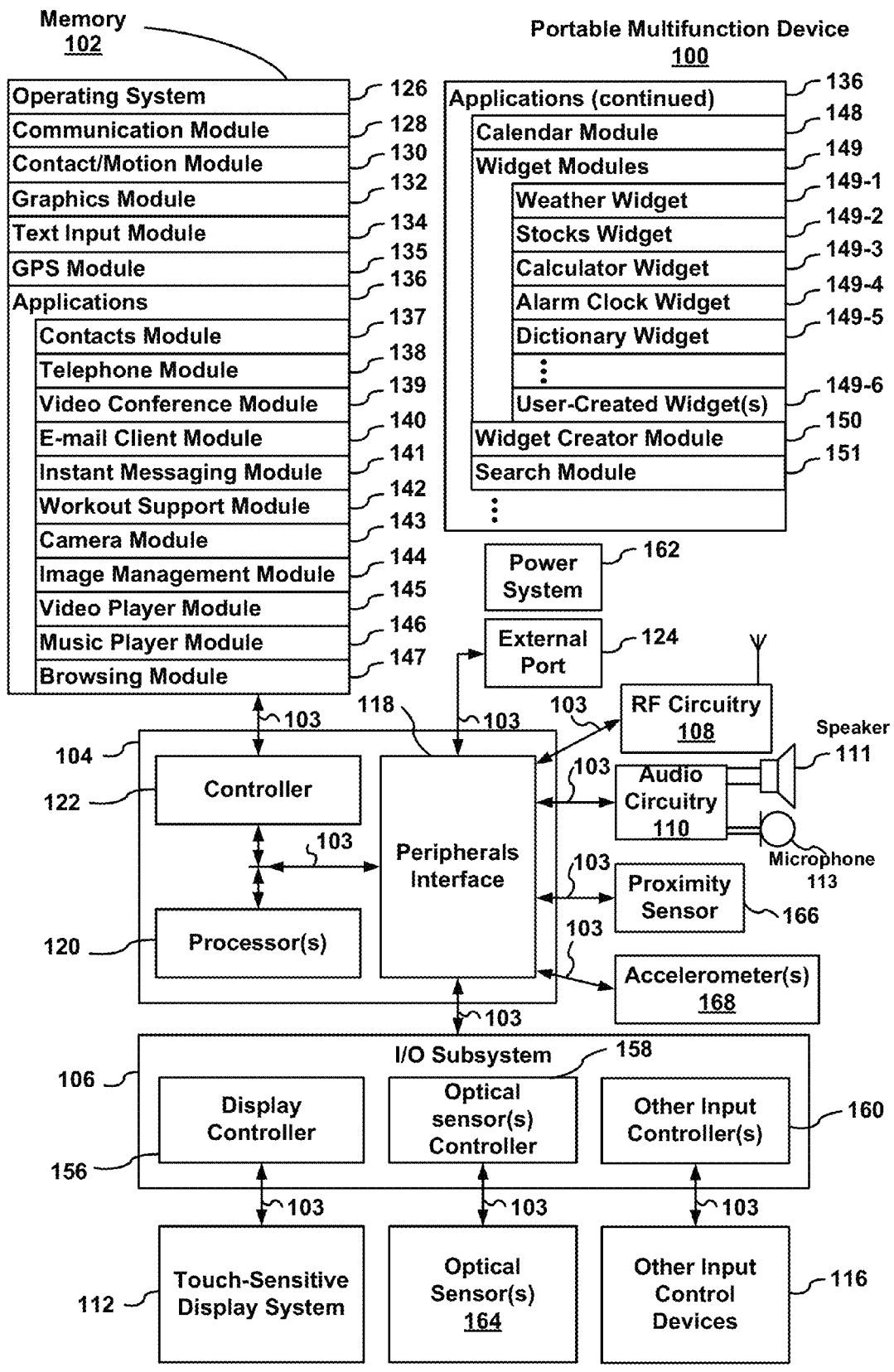
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Computer, Inc. of Cupertino, Calif.

In the discussion that follows, a multifunction device that includes a display and a touch-sensitive surface is described. It should be understood, however, that the multifunction device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent applications Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
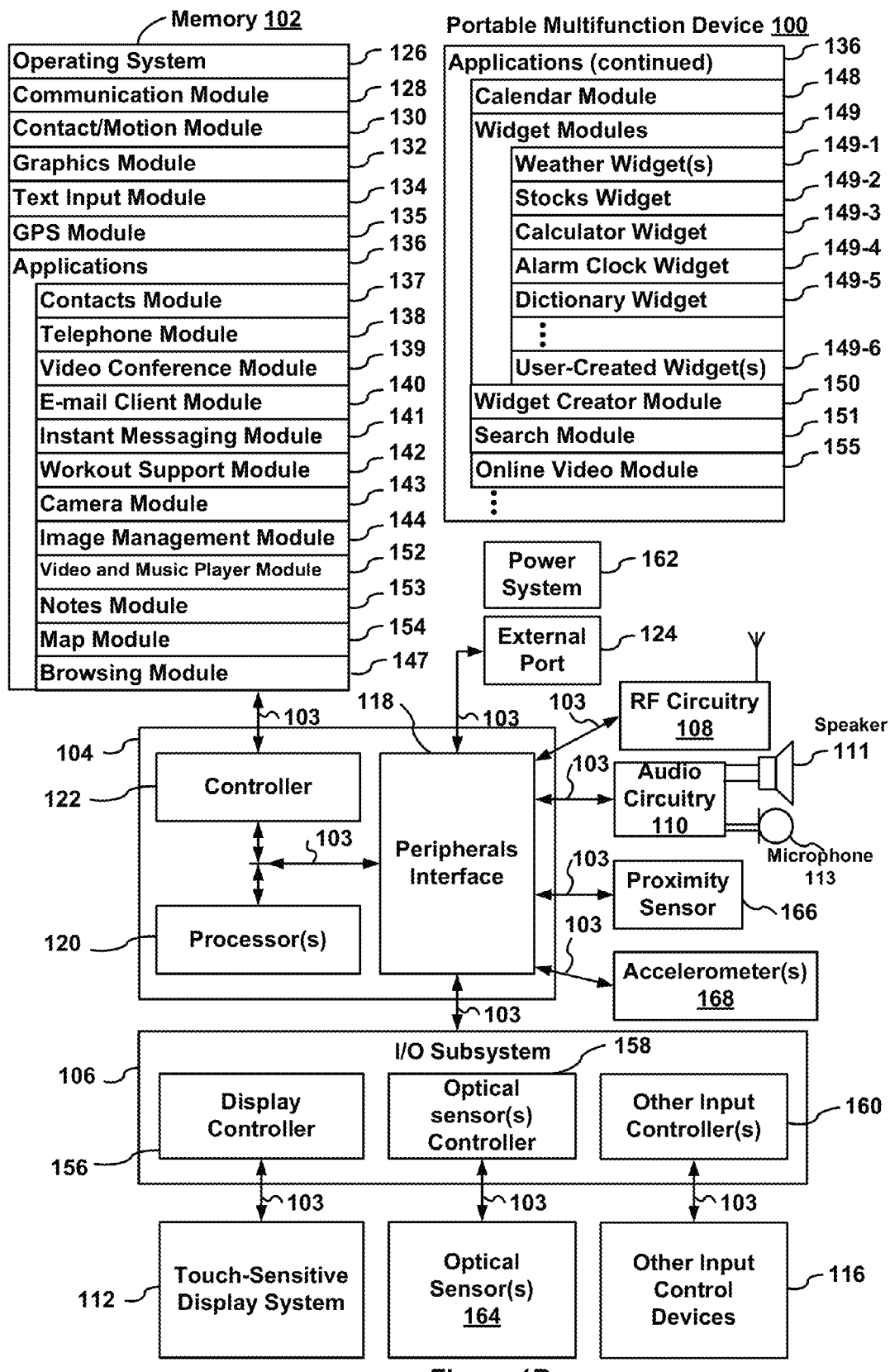

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Computer, Inc. of Cupertino, Calif.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture comprises detecting a finger-down event followed by detecting a finger-up event at the same position (or substantially the same position) as the finger-down event (e.g., at the position of an icon). As another example, detecting a finger swipe gesture on the touch-sensitive surface comprises detecting a finger-down event followed by detecting one or more finger-dragging events, and subsequently followed by detecting a finger-up event.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a workout support module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms). In some embodiments, searching is performed as described in U.S. patent application Ser. No. 12/400,763, "Search Capability Implementation for a Device," filed Mar. 9, 2009, which is incorporated by reference herein in its entirety.

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968, 067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
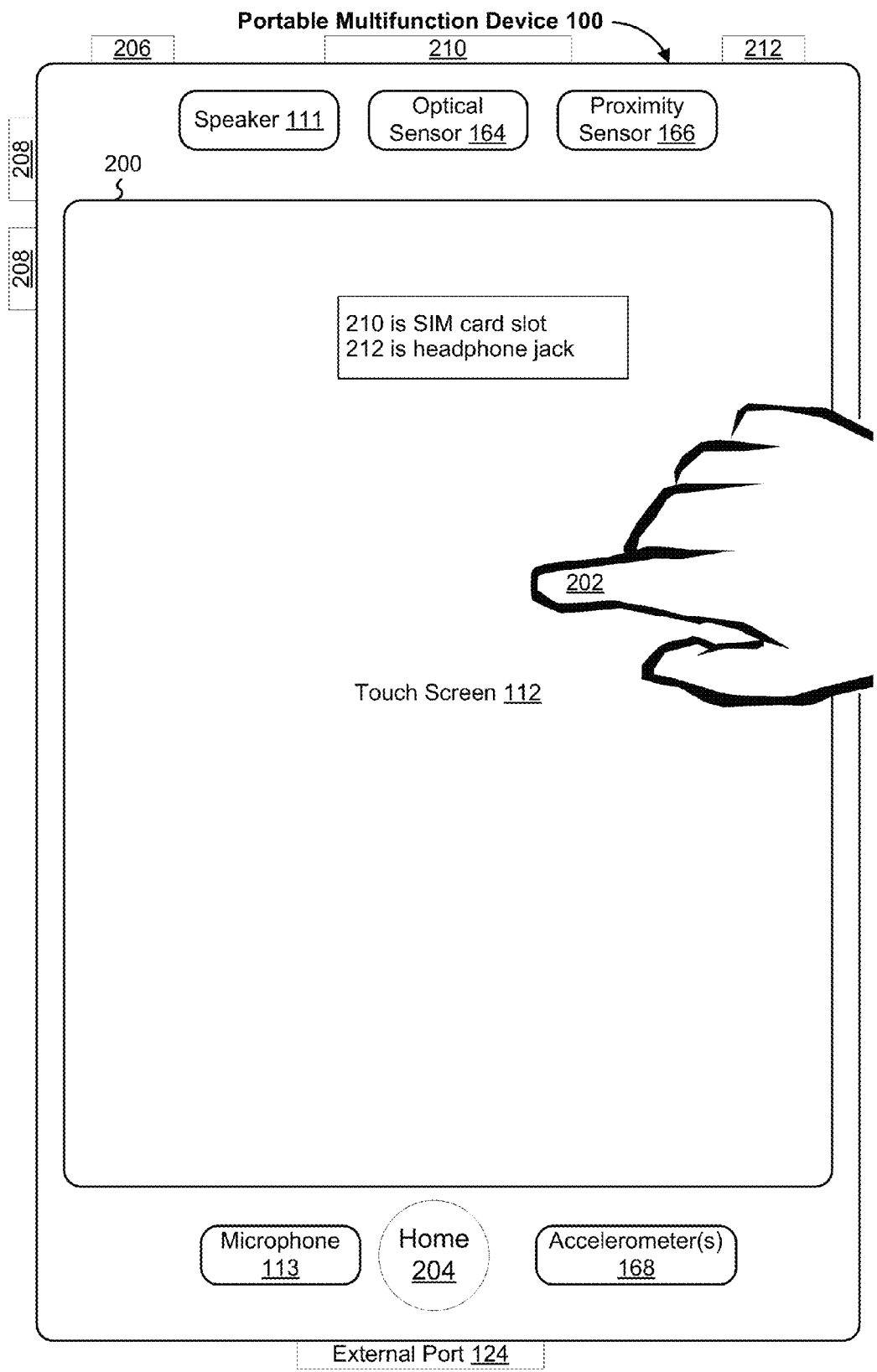
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
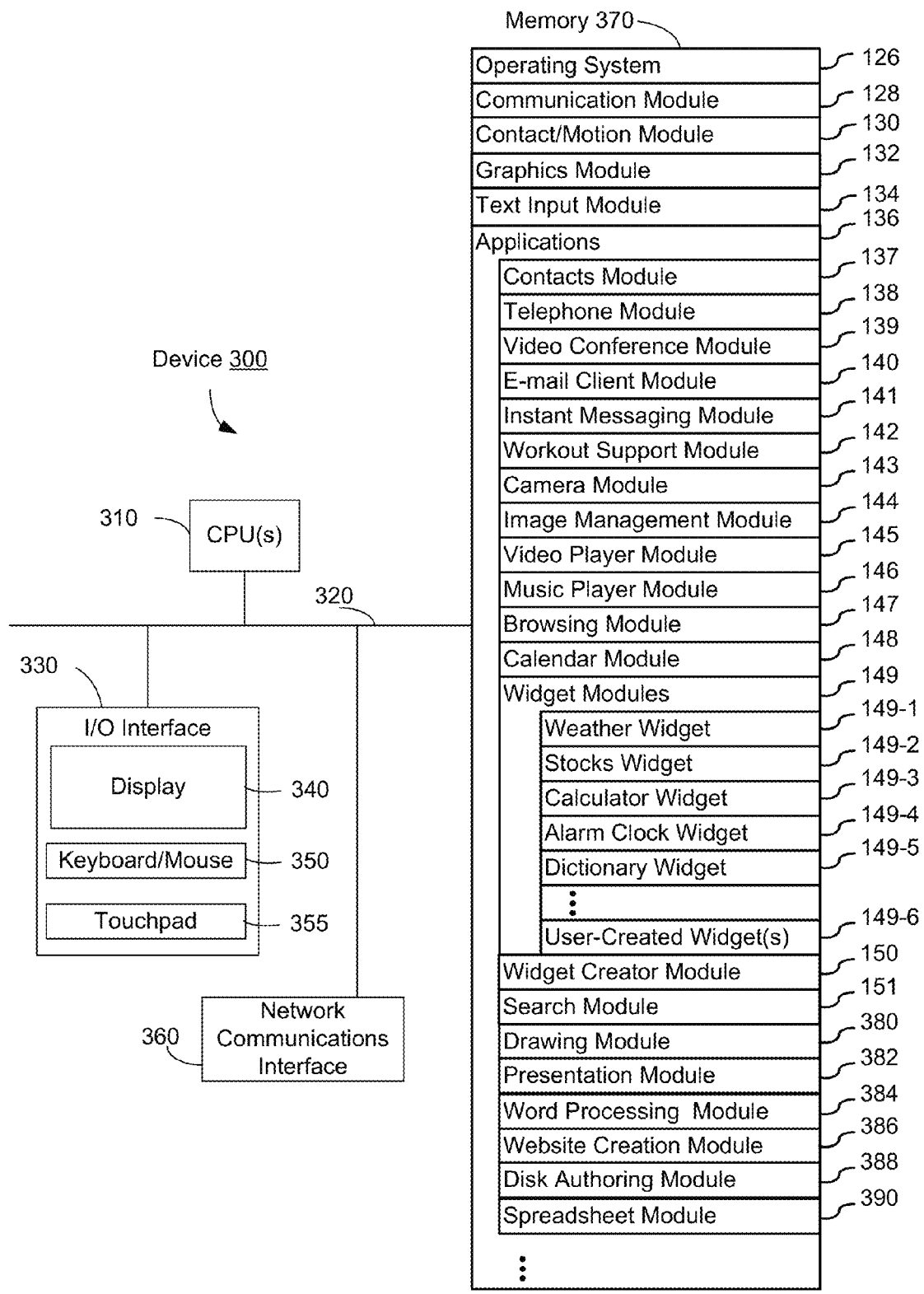
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, the device 300 is a laptop computer, a desktop computer, a table computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which in some embodiments is a touch screen display 112. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
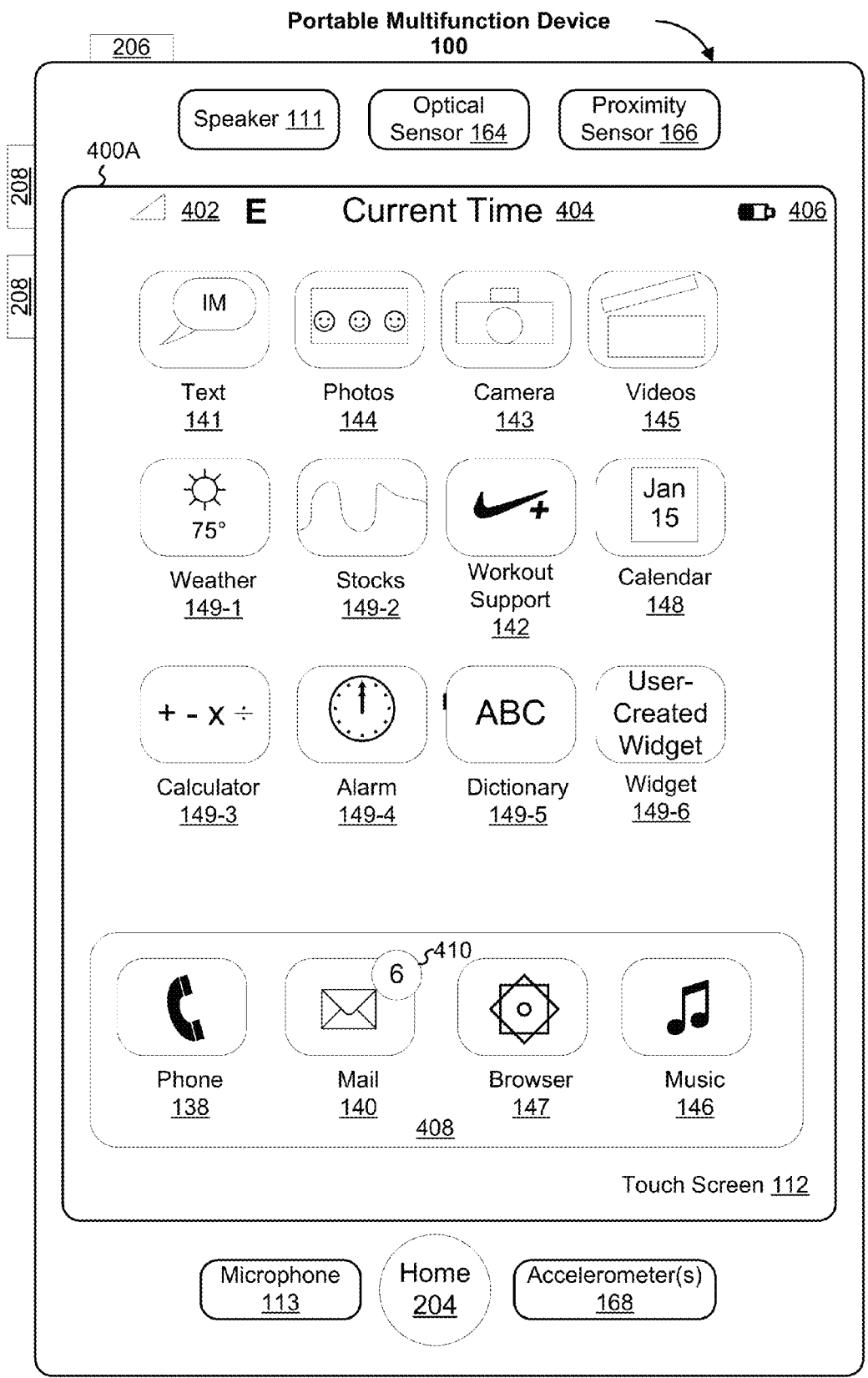
FIGS. 4A and 4B illustrate exemplary user interfaces for a menu of applications on a portable multifunction device in accordance with some embodiments.
Figure 4B:
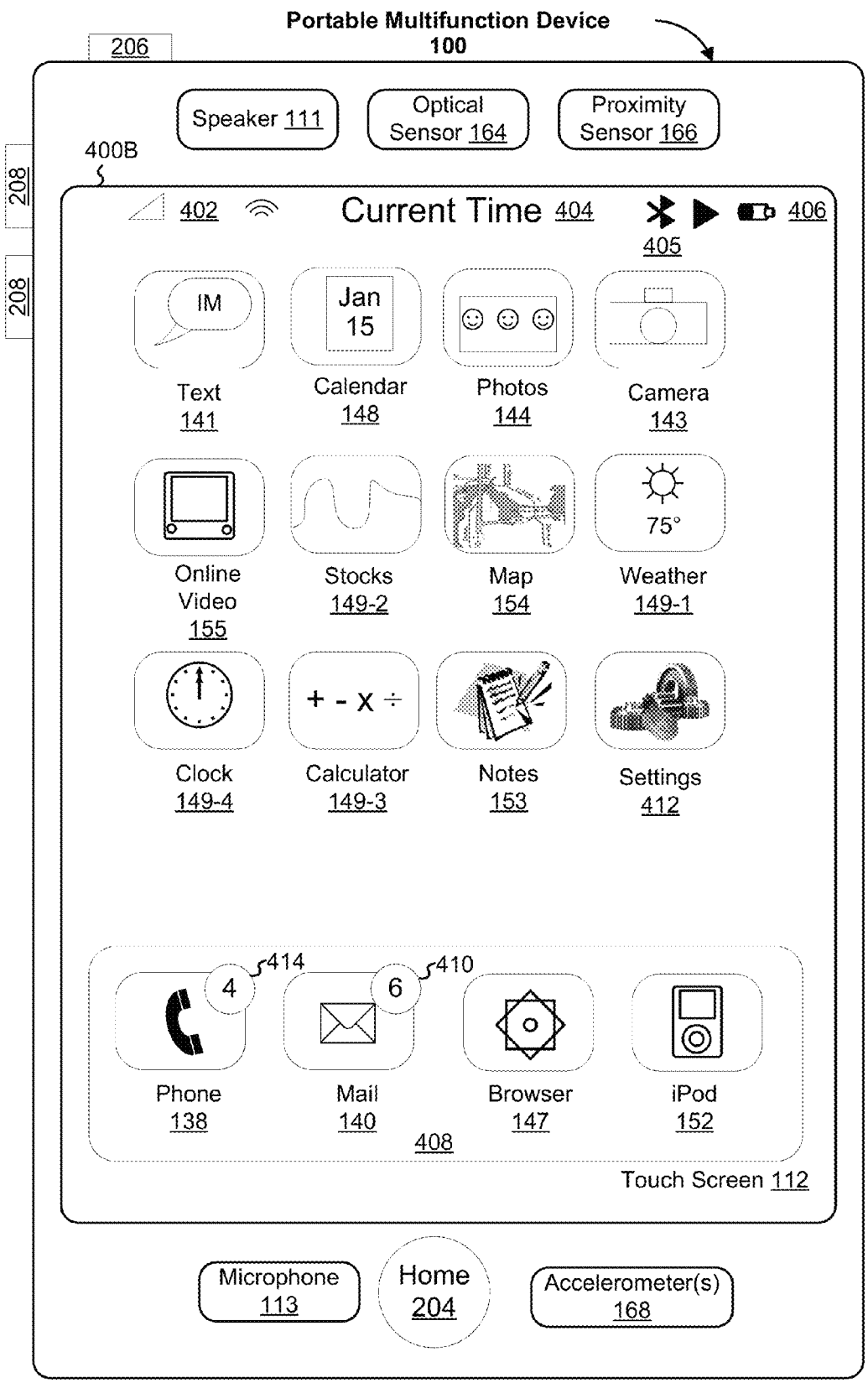

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
 Phone 138, which may include an indicator 414 of the number of missed calls or voicemail messages;
 E-mail client 140, which may include an indicator 410 of the number of unread e-mails;
 Browser 147; and
 Music player 146; and
Icons for other applications, such as:
 IM 141;
 Image management 144;
 Camera 143;
 Video player 145;
 Weather 149-1;
 Stocks 149-2;
 Workout support 142;
 Calendar 148;
 Calculator 149-3;
 Alarm clock 149-4;
 Dictionary 149-5; and
 User-created widget 149-6.

In some embodiments, user interface 400B includes the following elements, or a subset or superset thereof:
402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for the device 100 and its various applications 136, as described further below;
Video and music player module 152, also referred to as iPod (trademark of Apple Computer, Inc.) module 152; and
Online video module 155, also referred to as YouTube (trademark of Google, Inc.) module 155.

Attention is now directed towards embodiments of user interfaces ("UI") and associated processes that may be implemented on a computing device with a display and a touch-sensitive surface, such as device 300 or portable multifunction device 100.

Figure 5A:
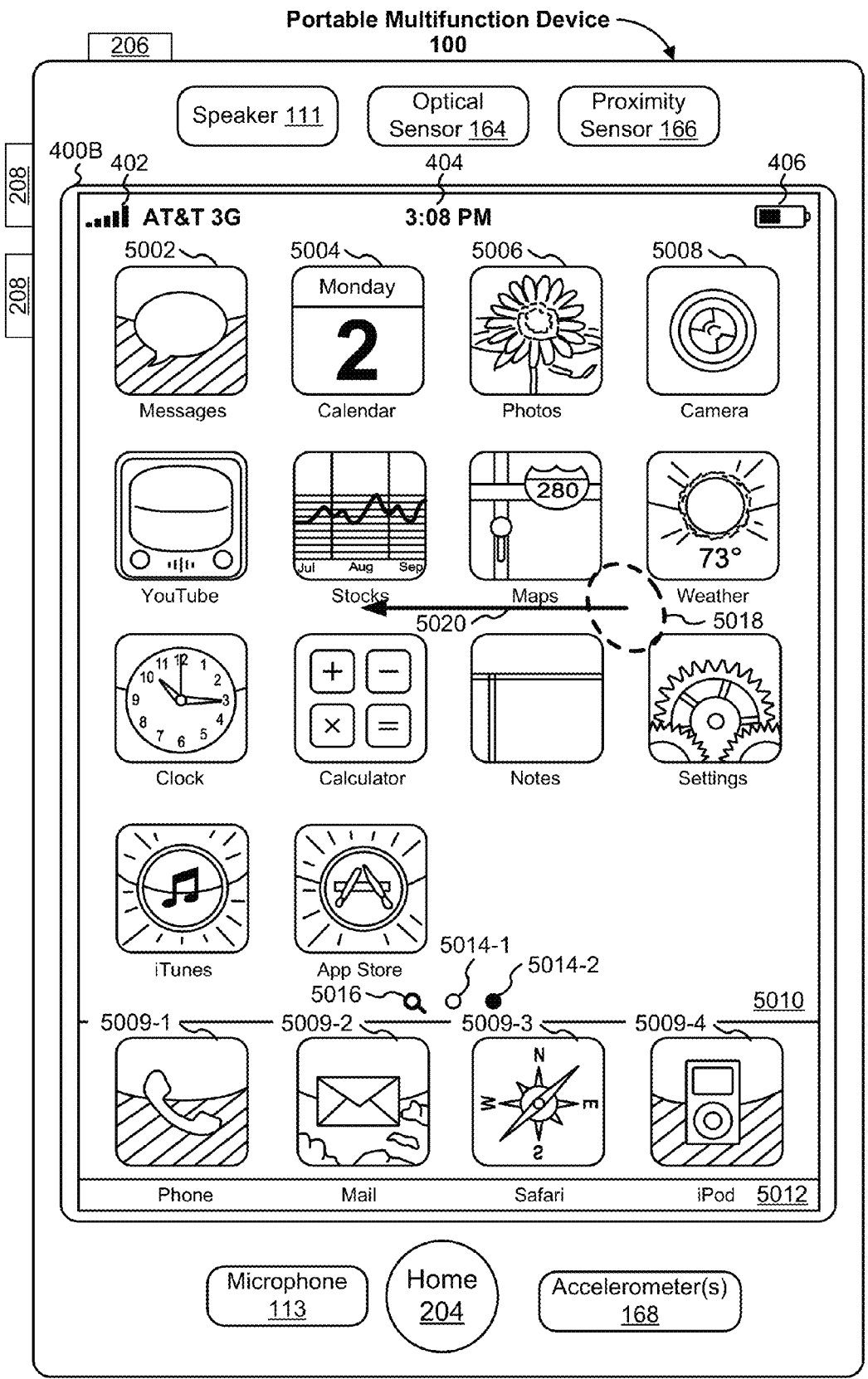
FIGS. 5A-5Y illustrate exemplary user interfaces for performing integrated searches and accessing data associated with a plurality of applications in accordance with some embodiments.
Figure 5B:
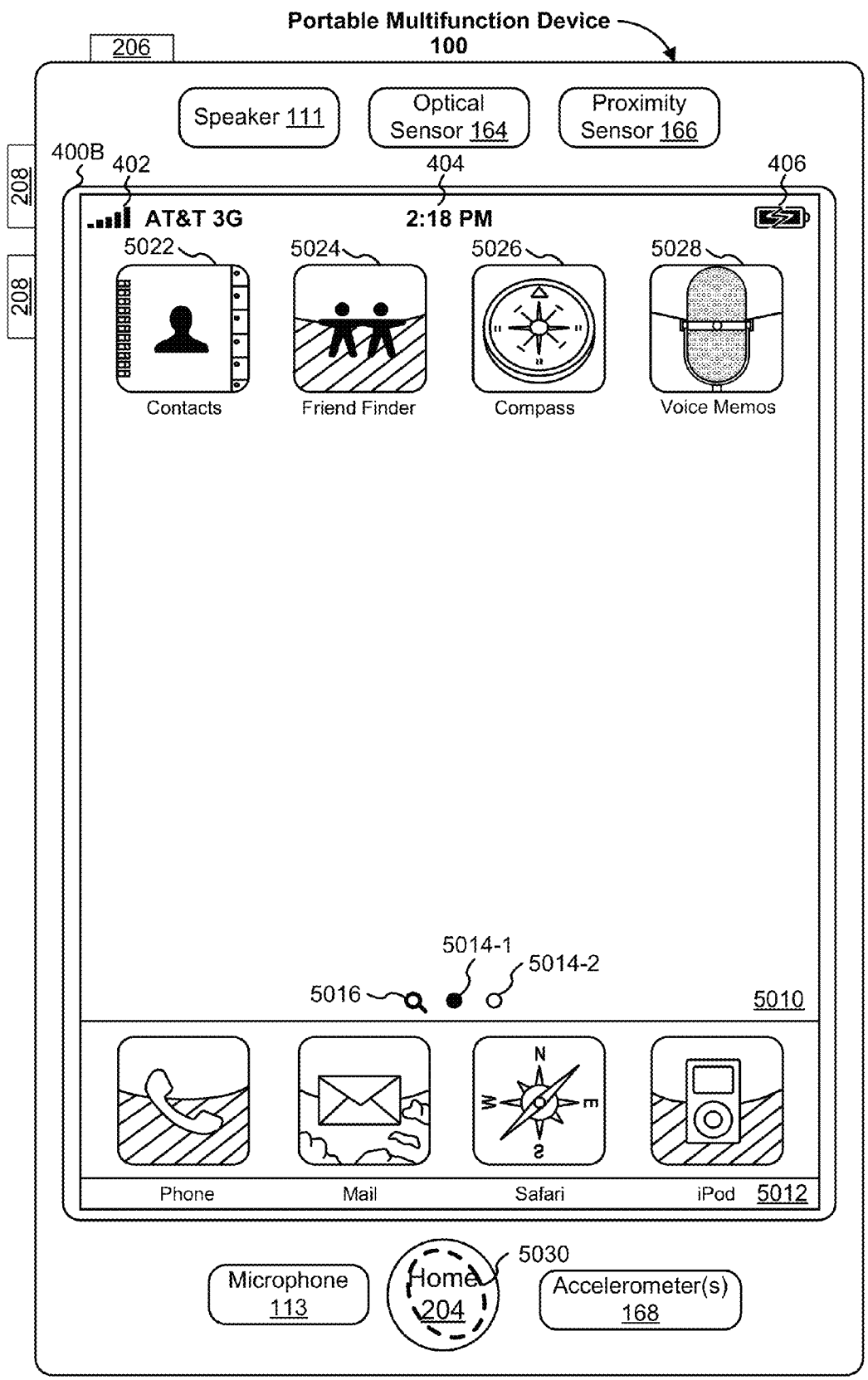
Figure 5C:
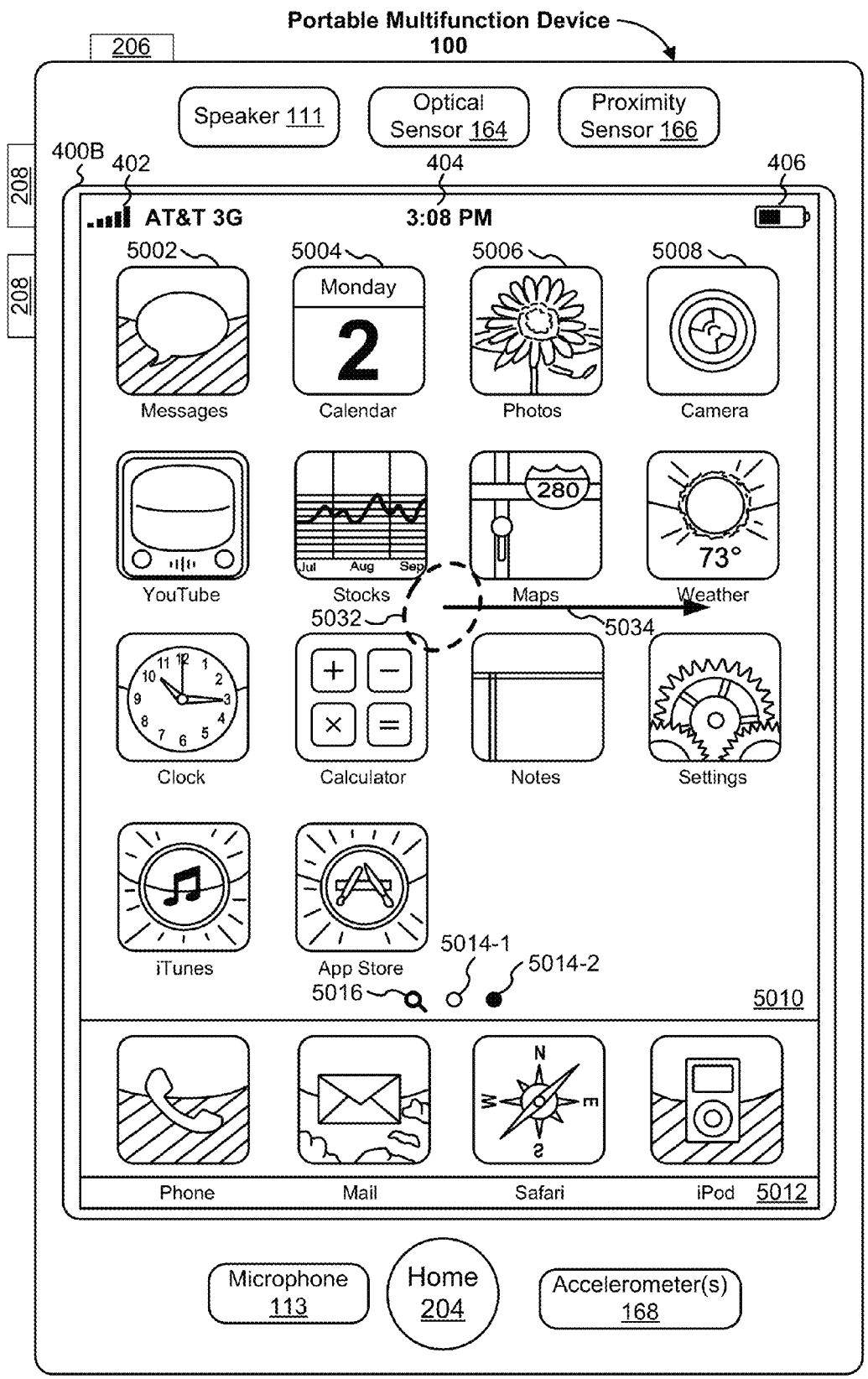
Figure 5D:
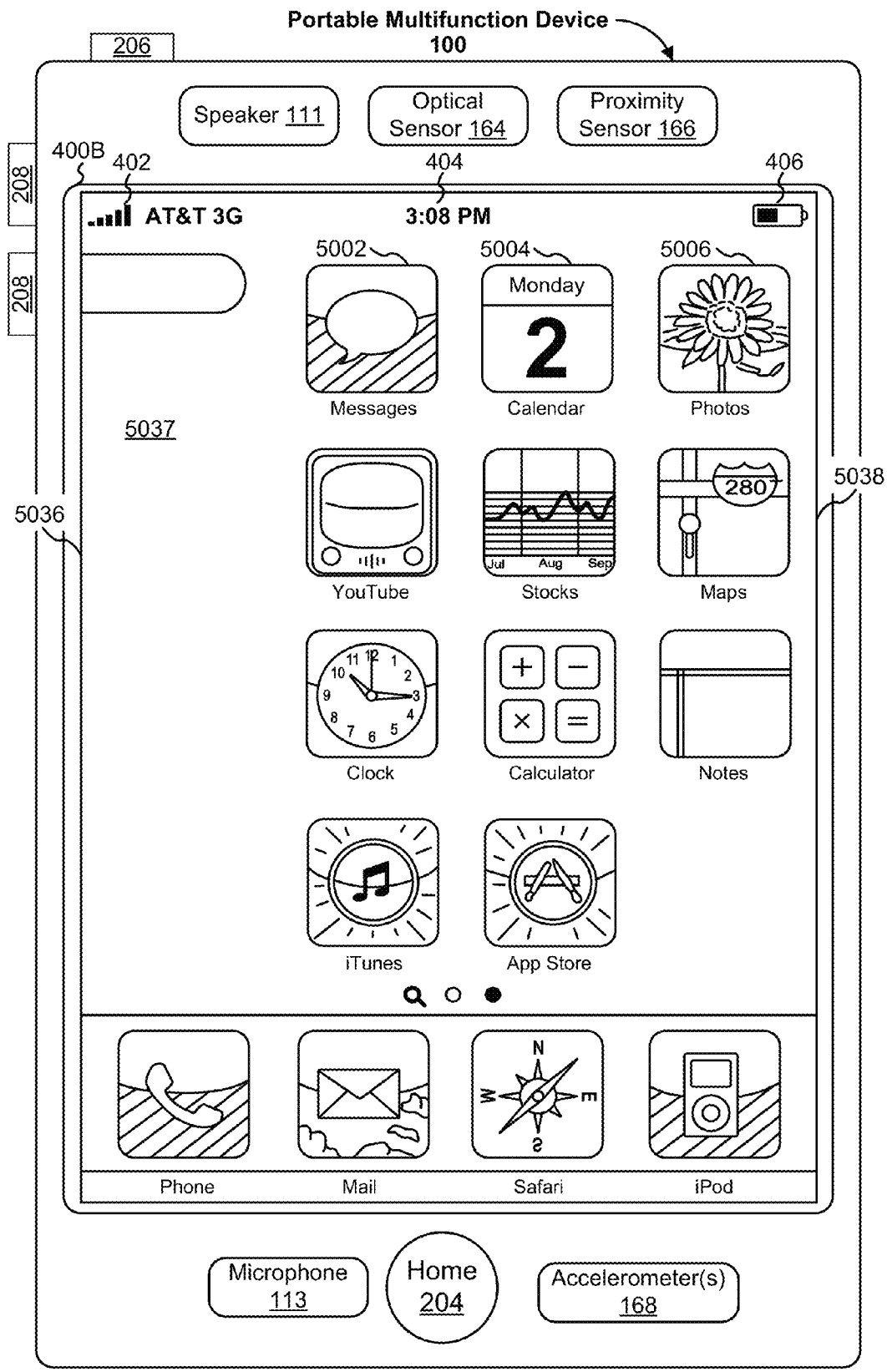
Figure 5E:
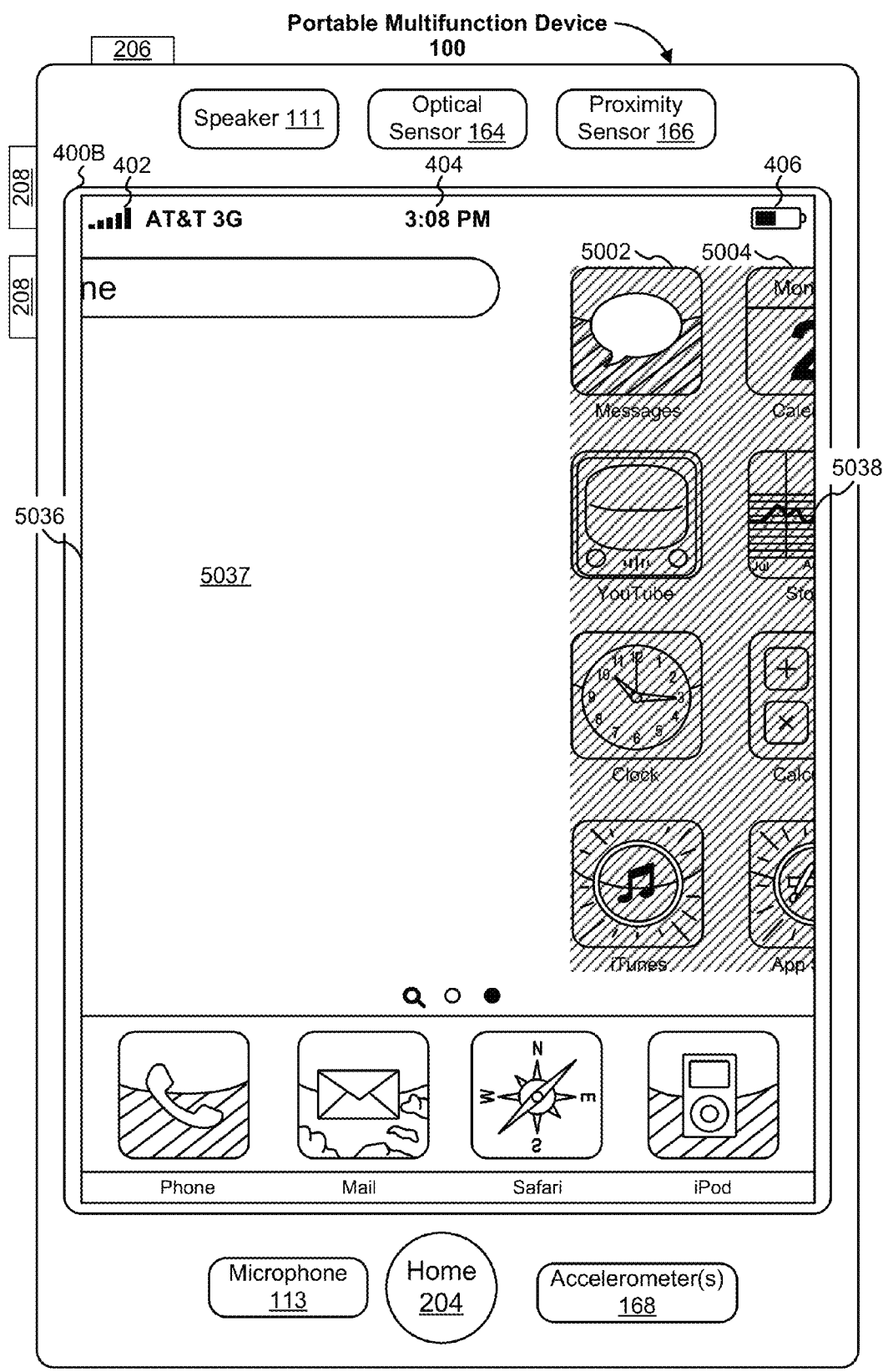
Figure 5F:
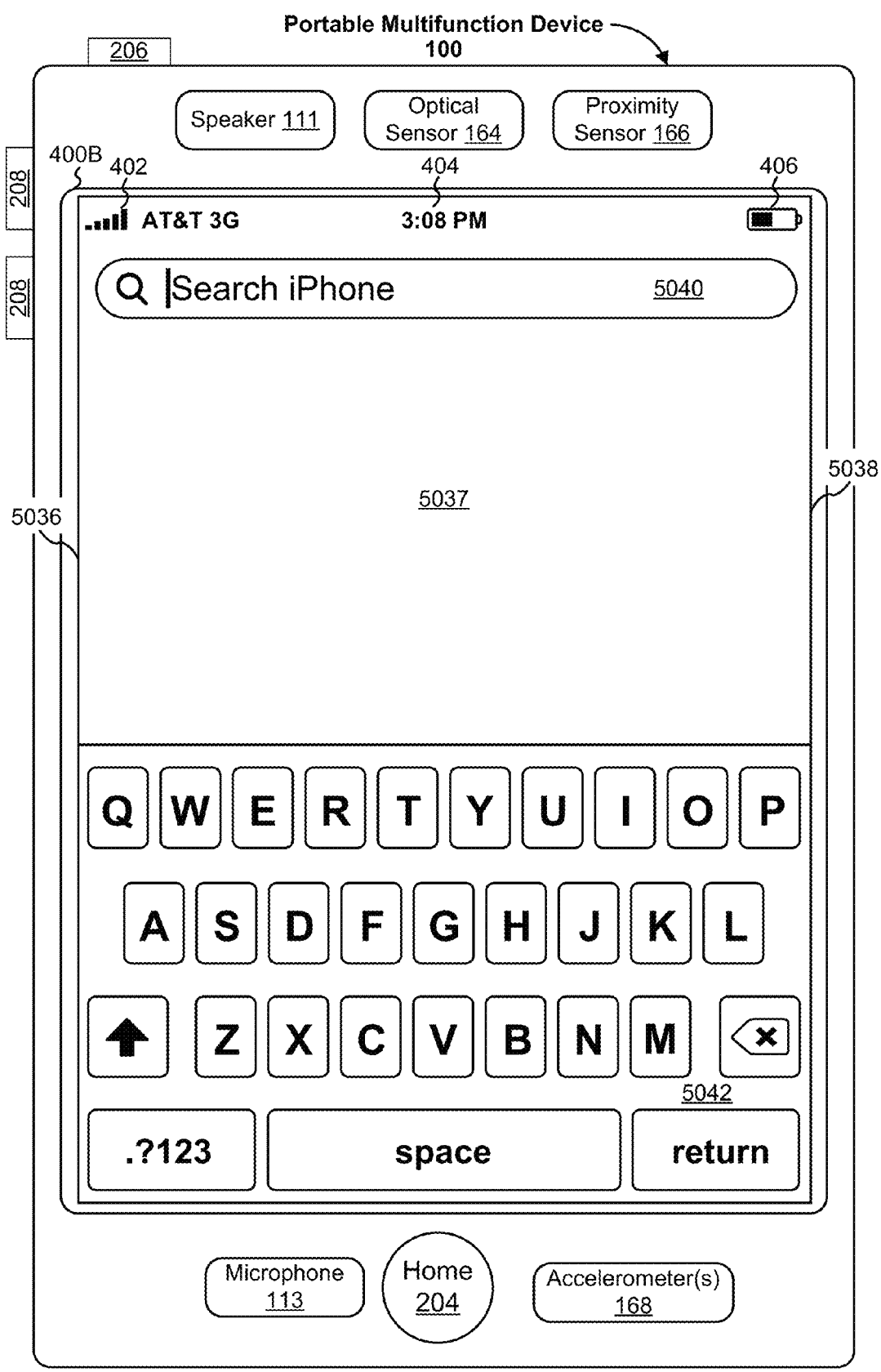
Figure 5G:
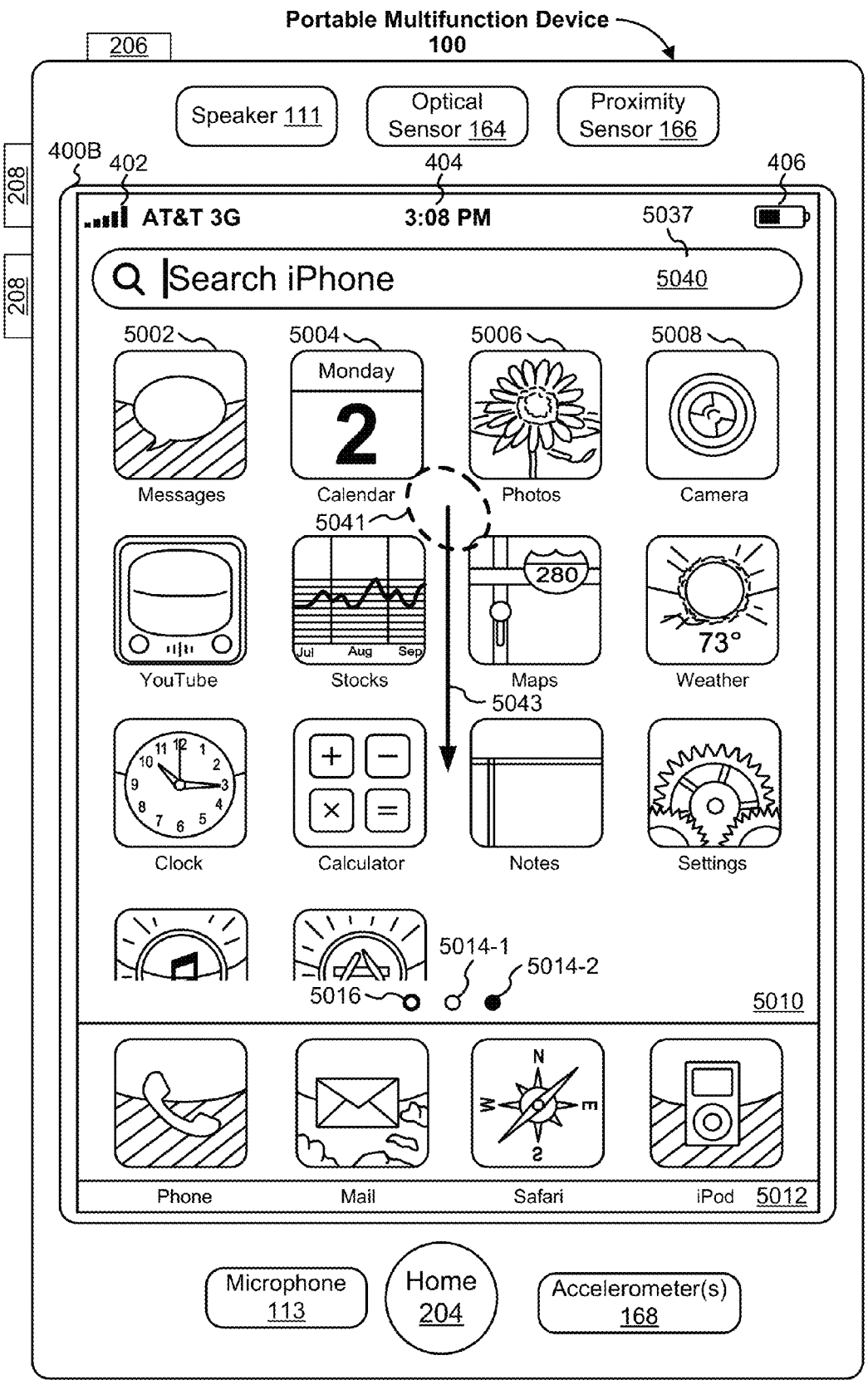
Figure 5H:
Figure 5I:
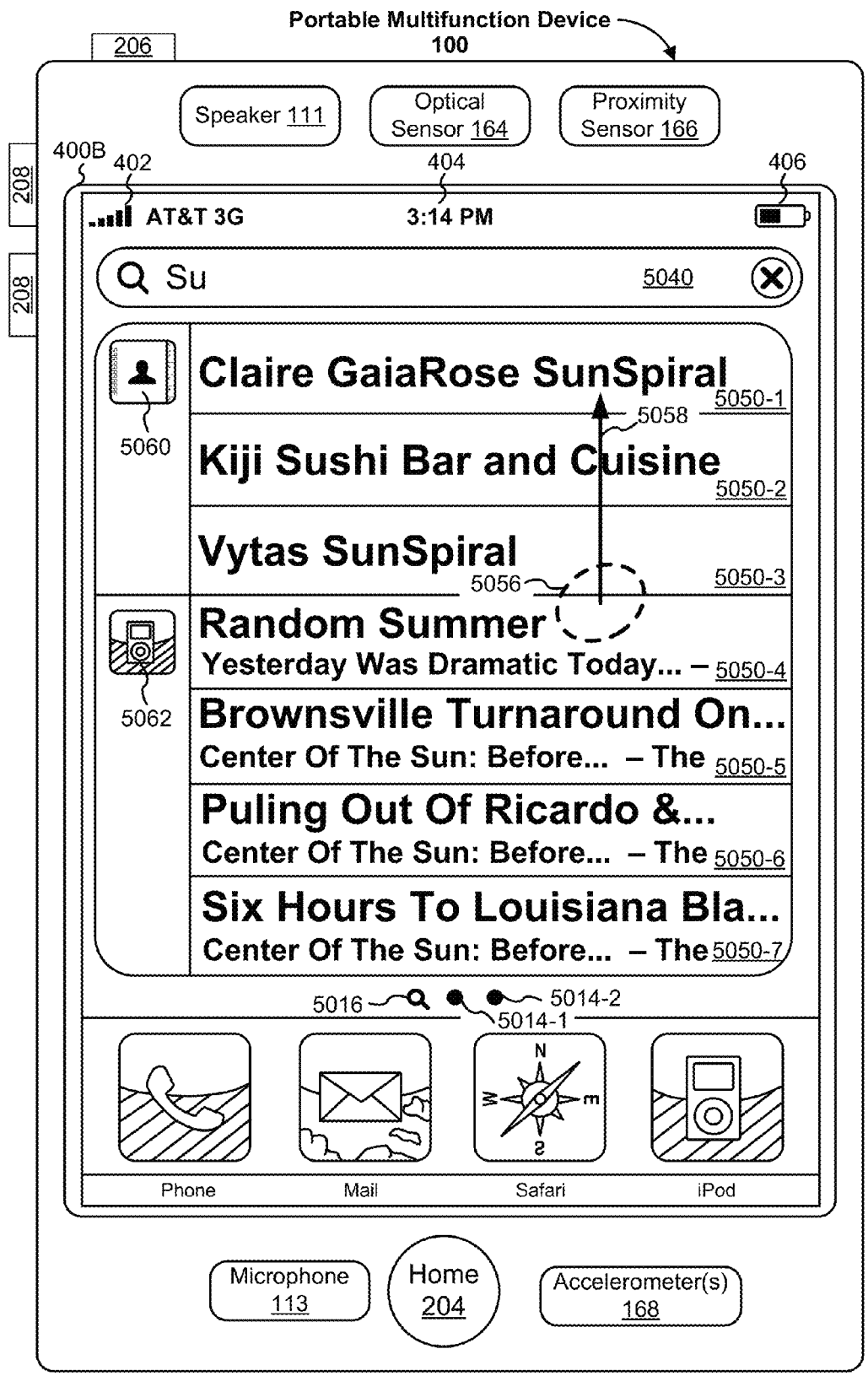
Figure 5J:
Figure 5K:
Figure 5L:
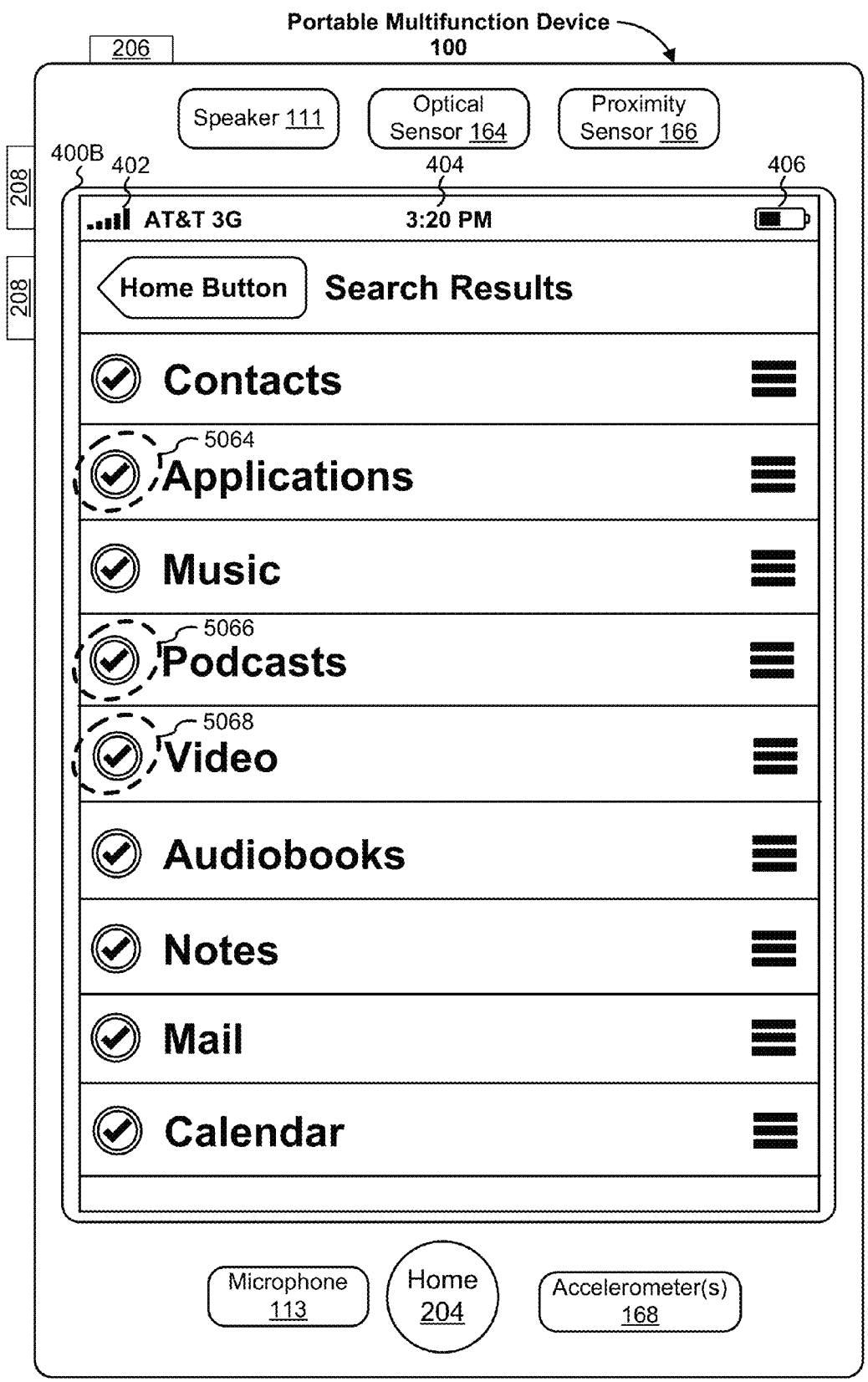
Figure 5M:
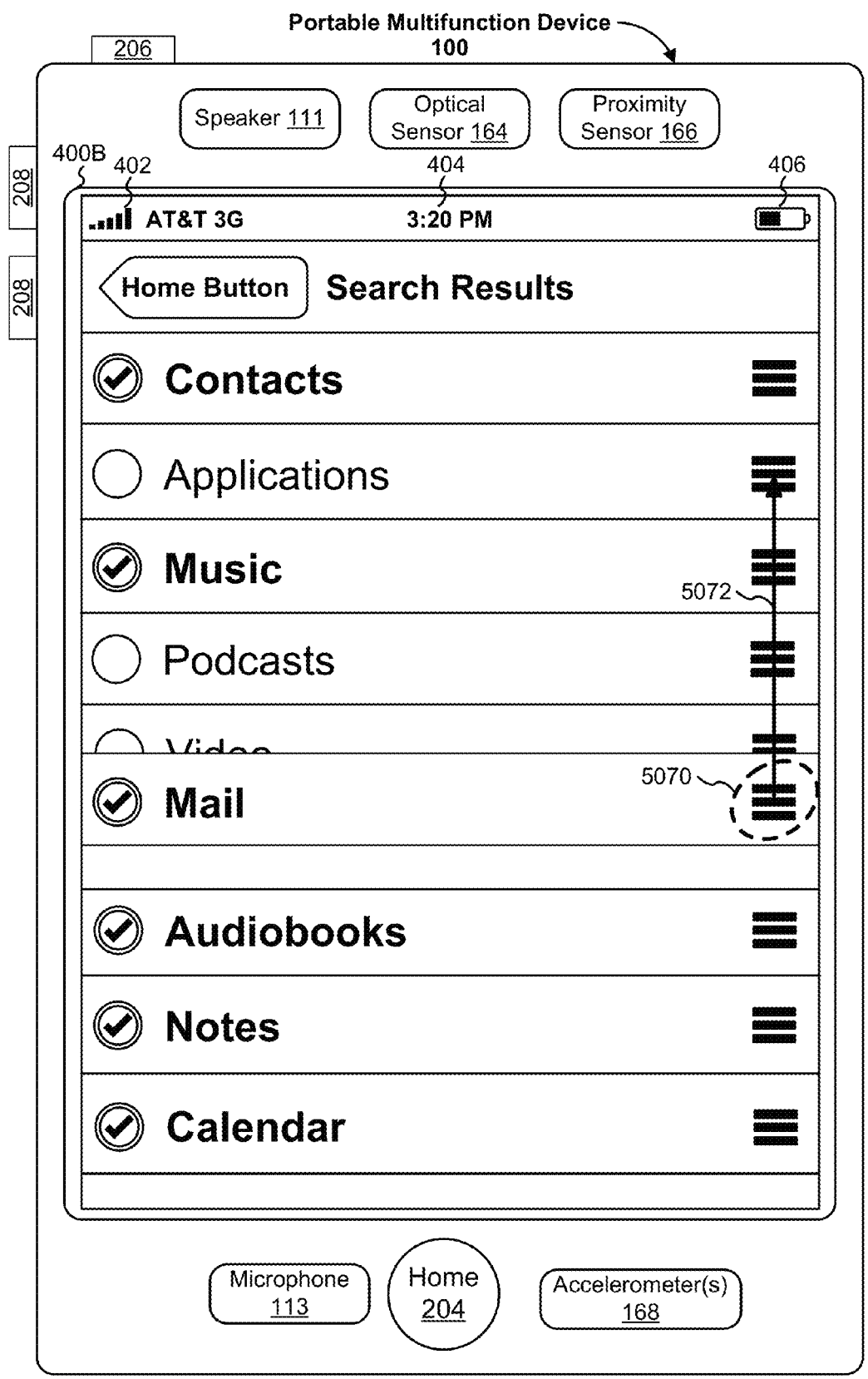
Figure 5N:
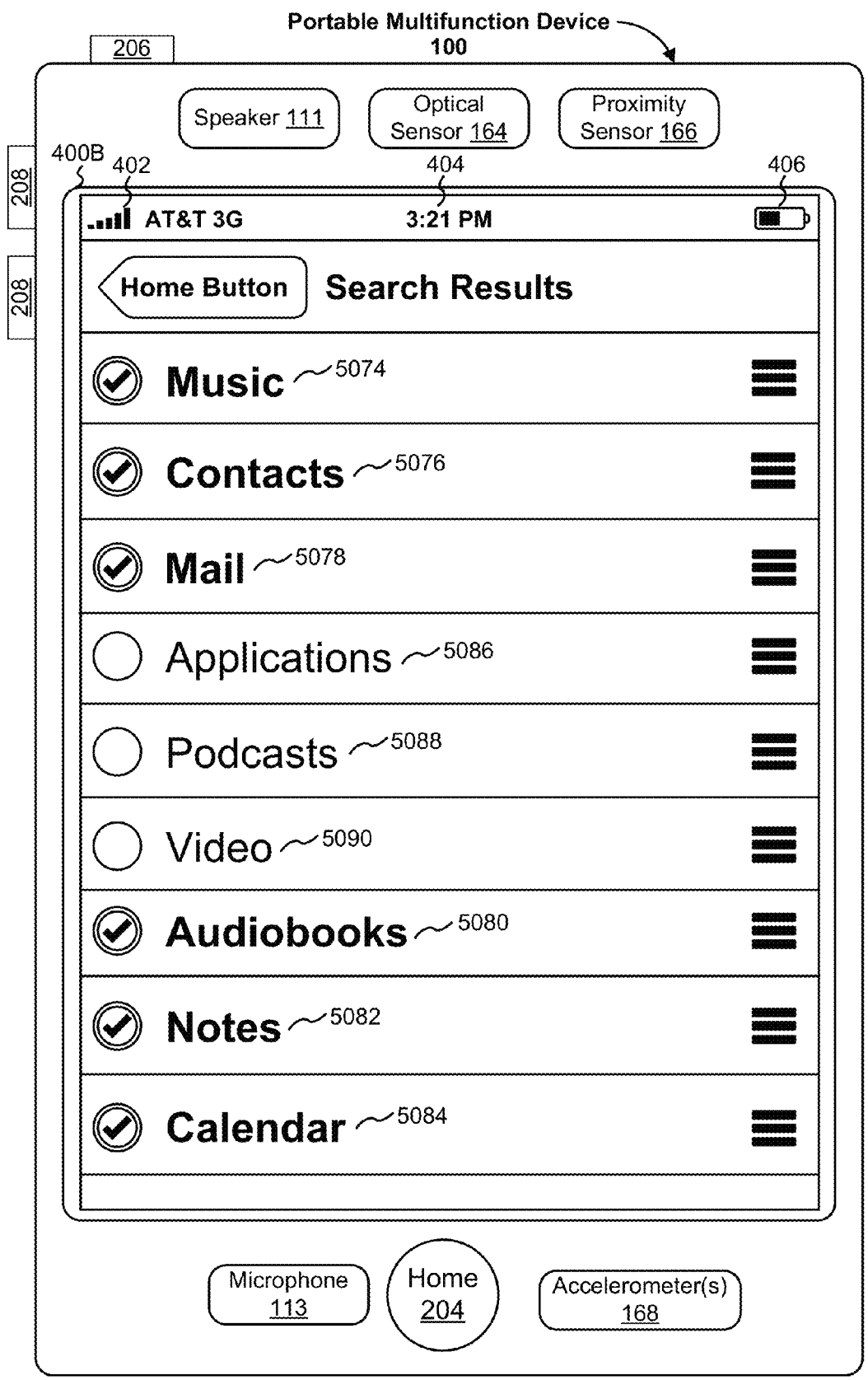
Figure 5O:
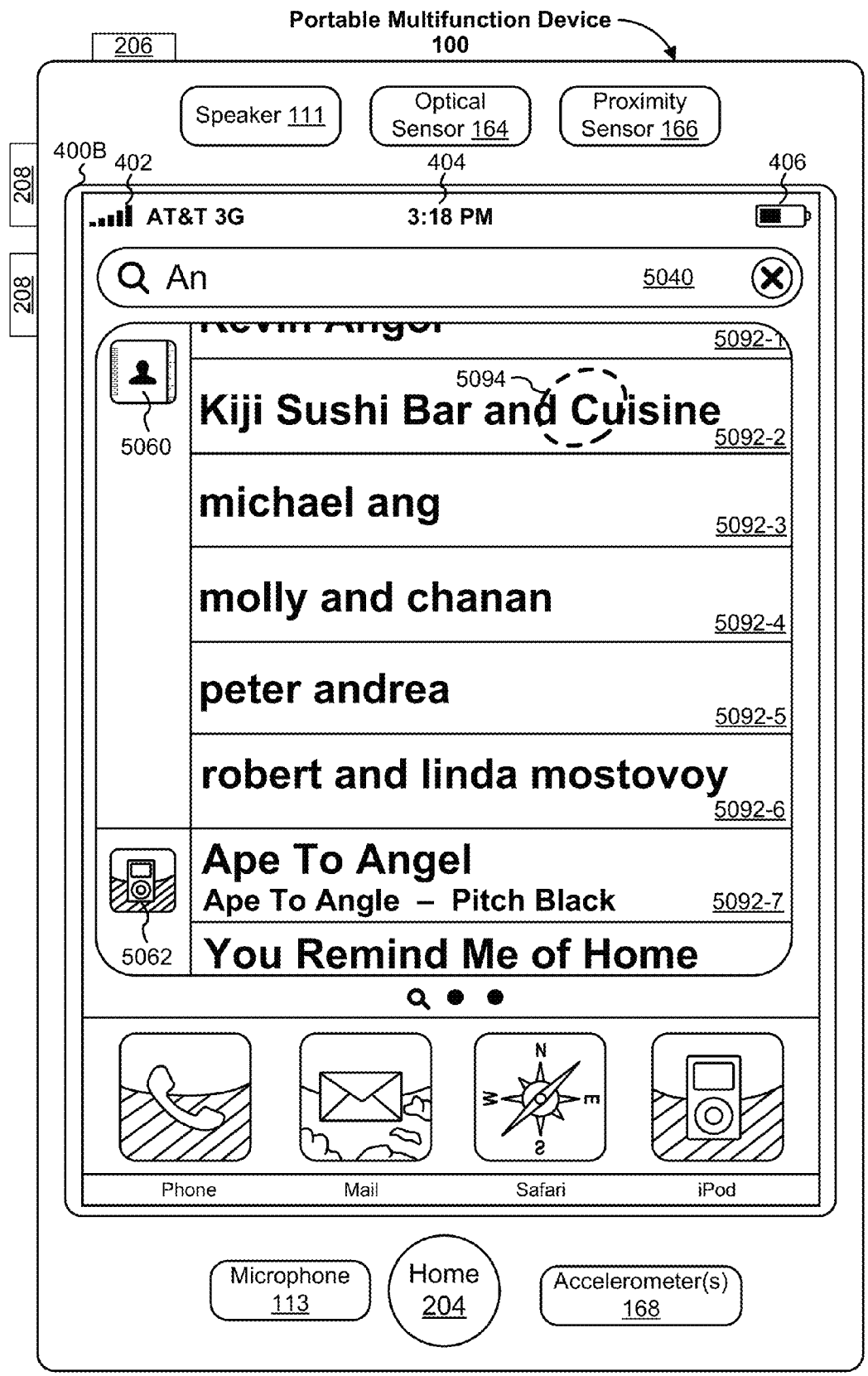
Figure 5P:
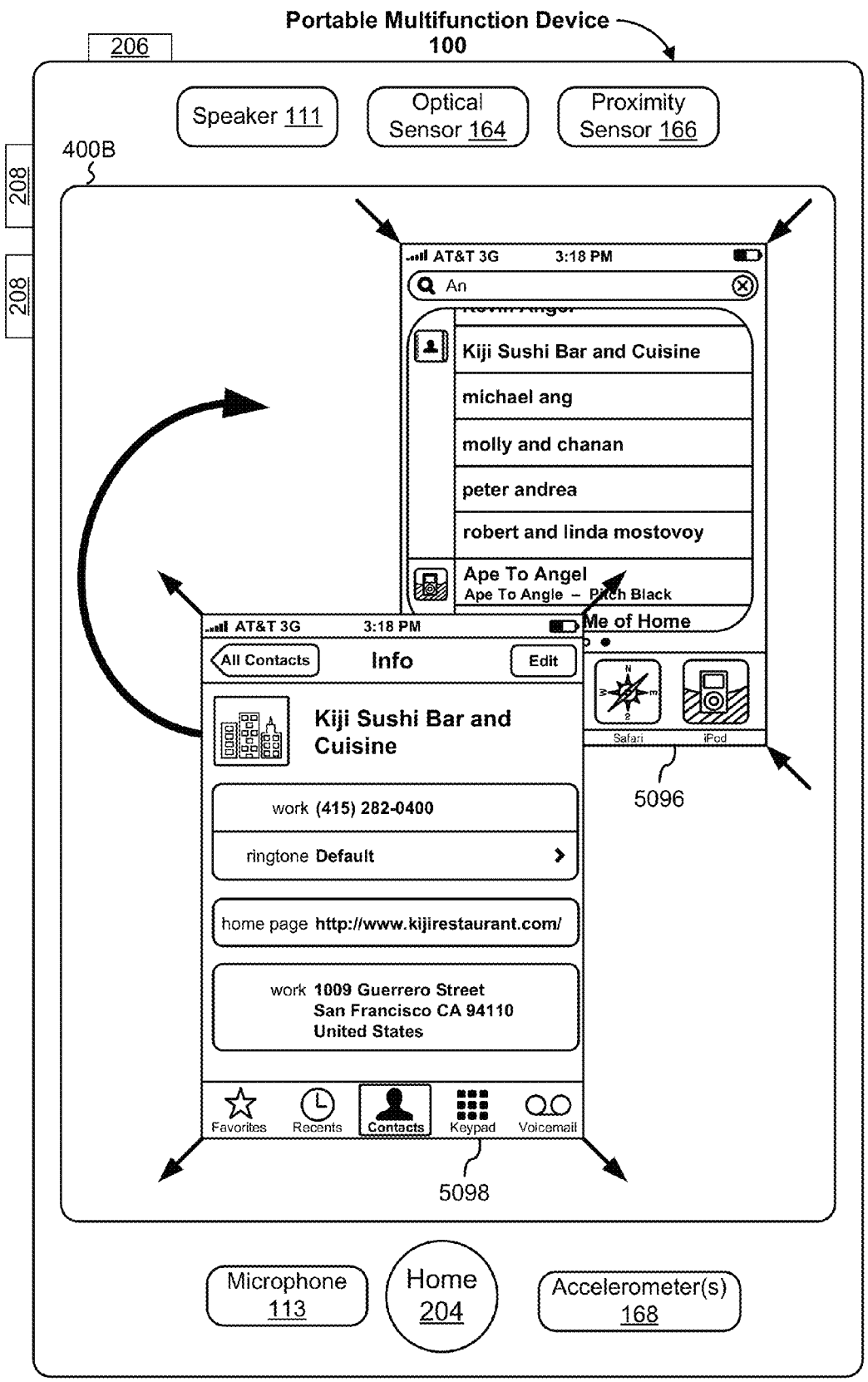
Figure 5Q:
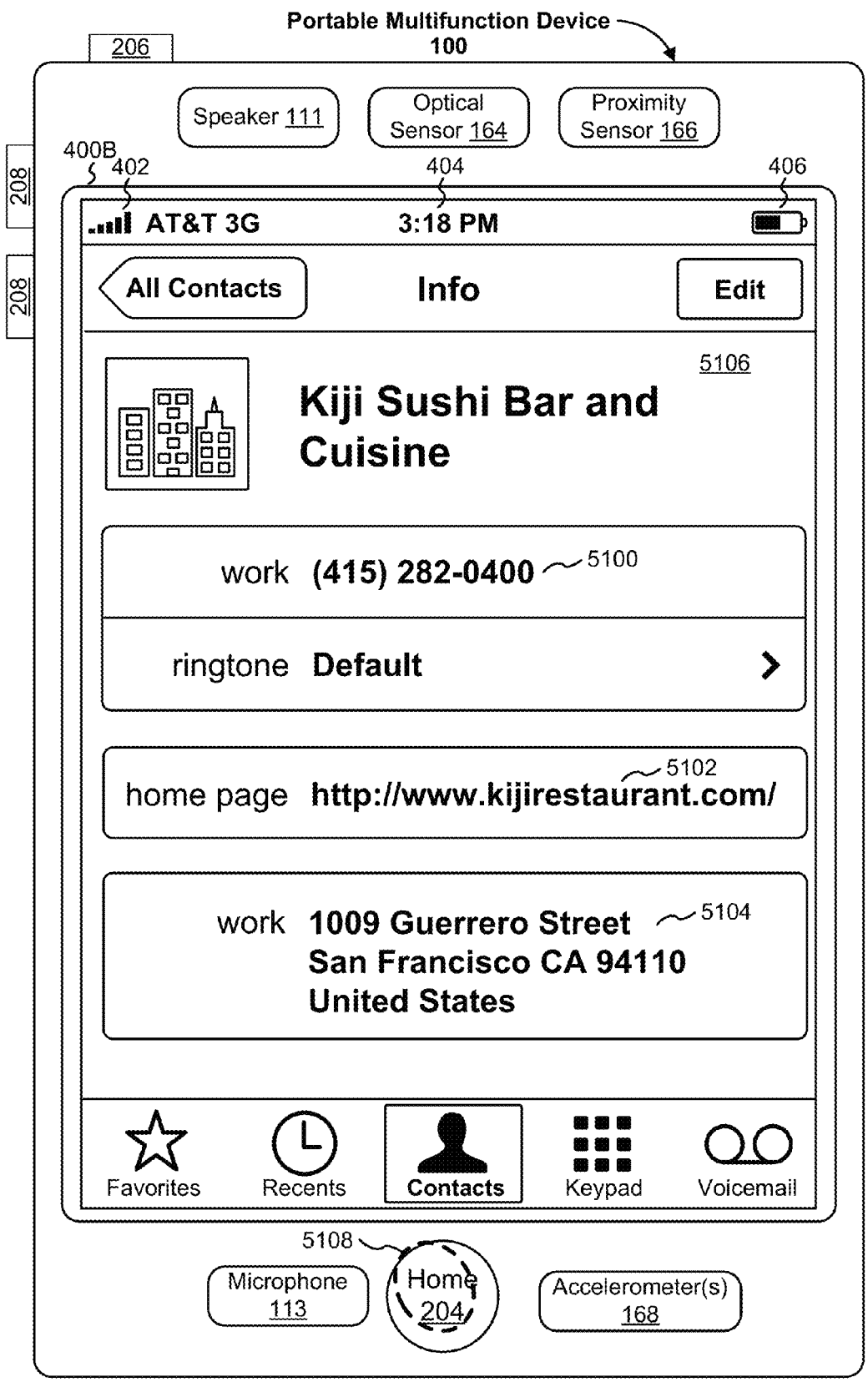
Figure 5R:
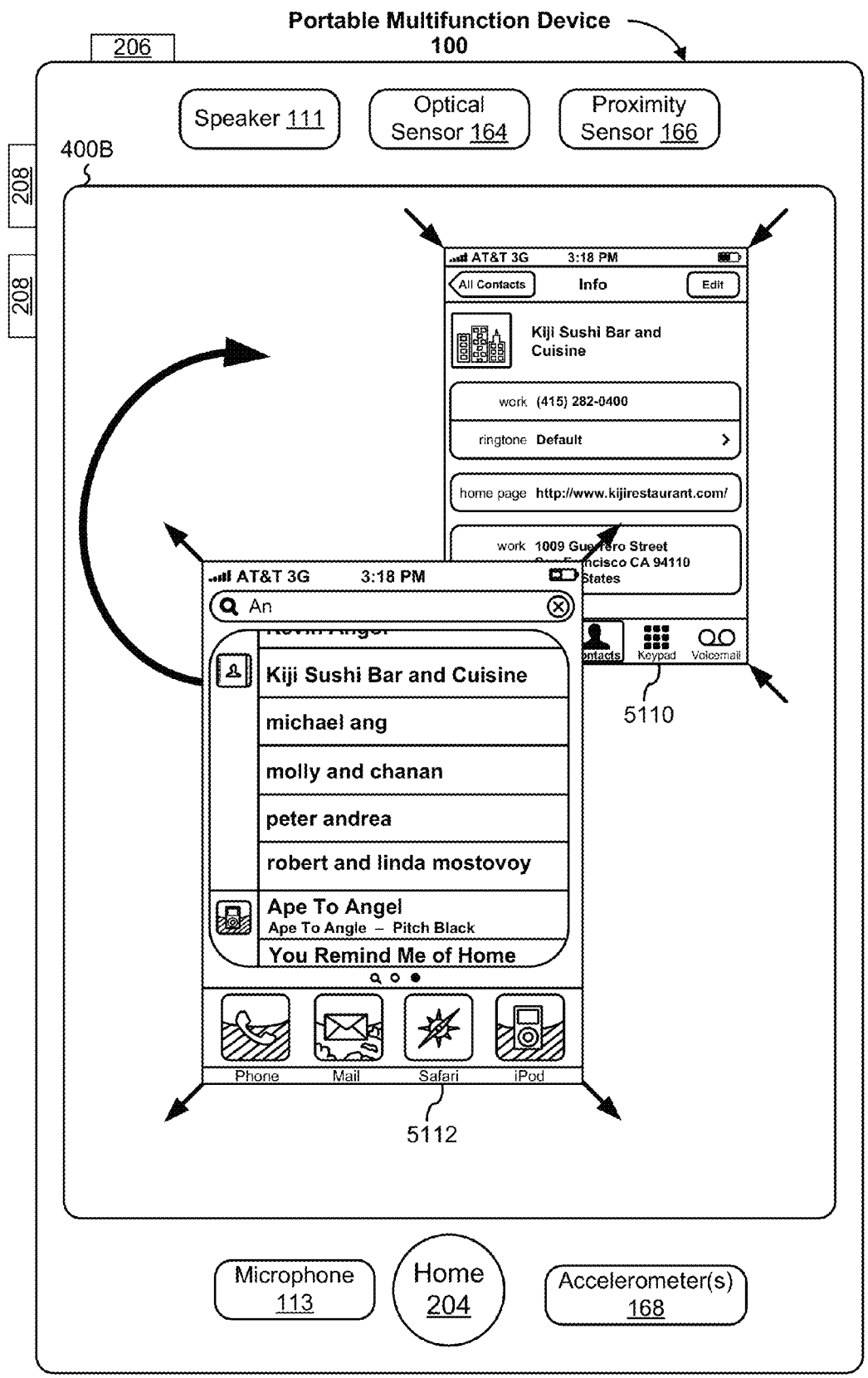
Figure 5S:
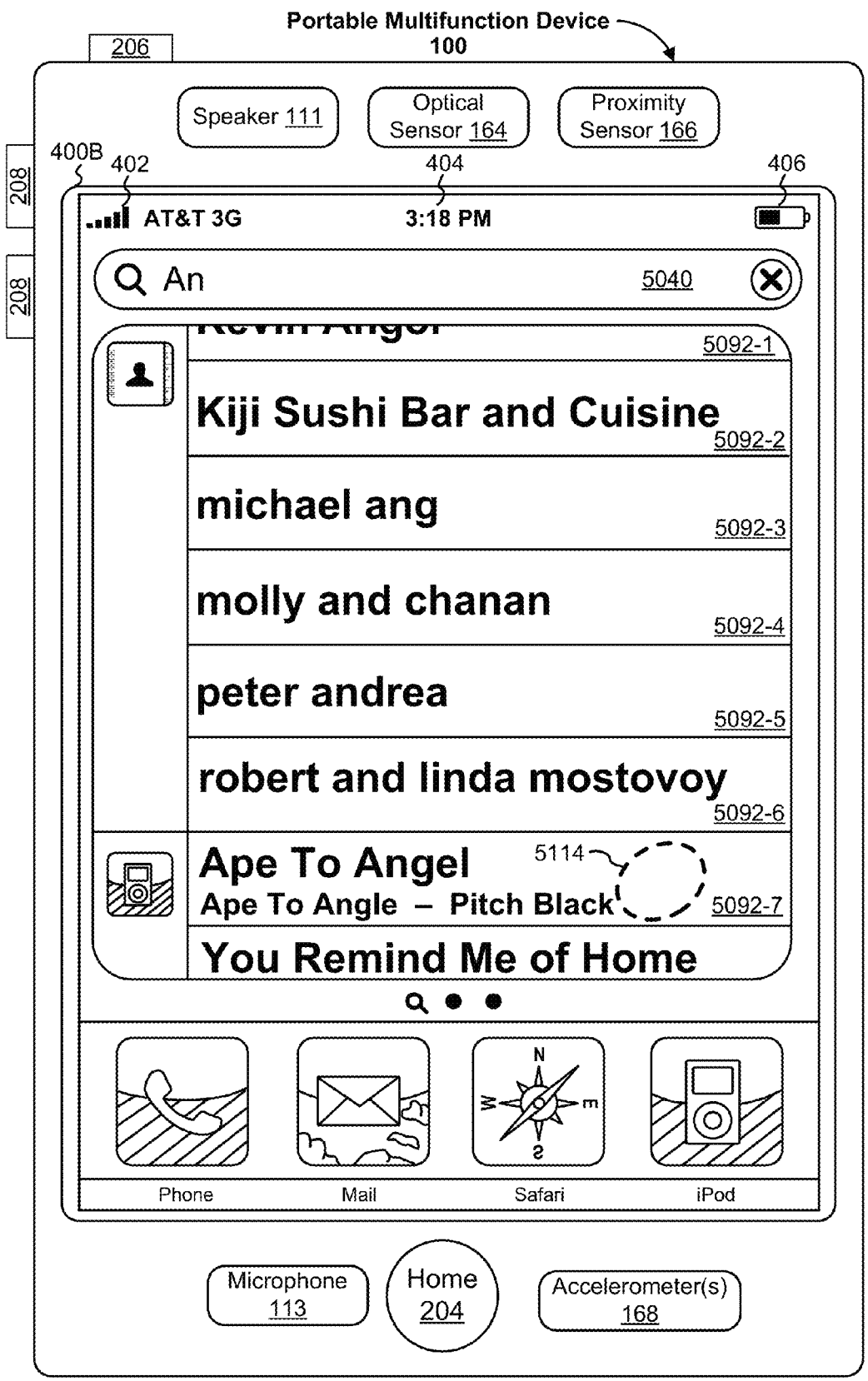
Figure 5T:
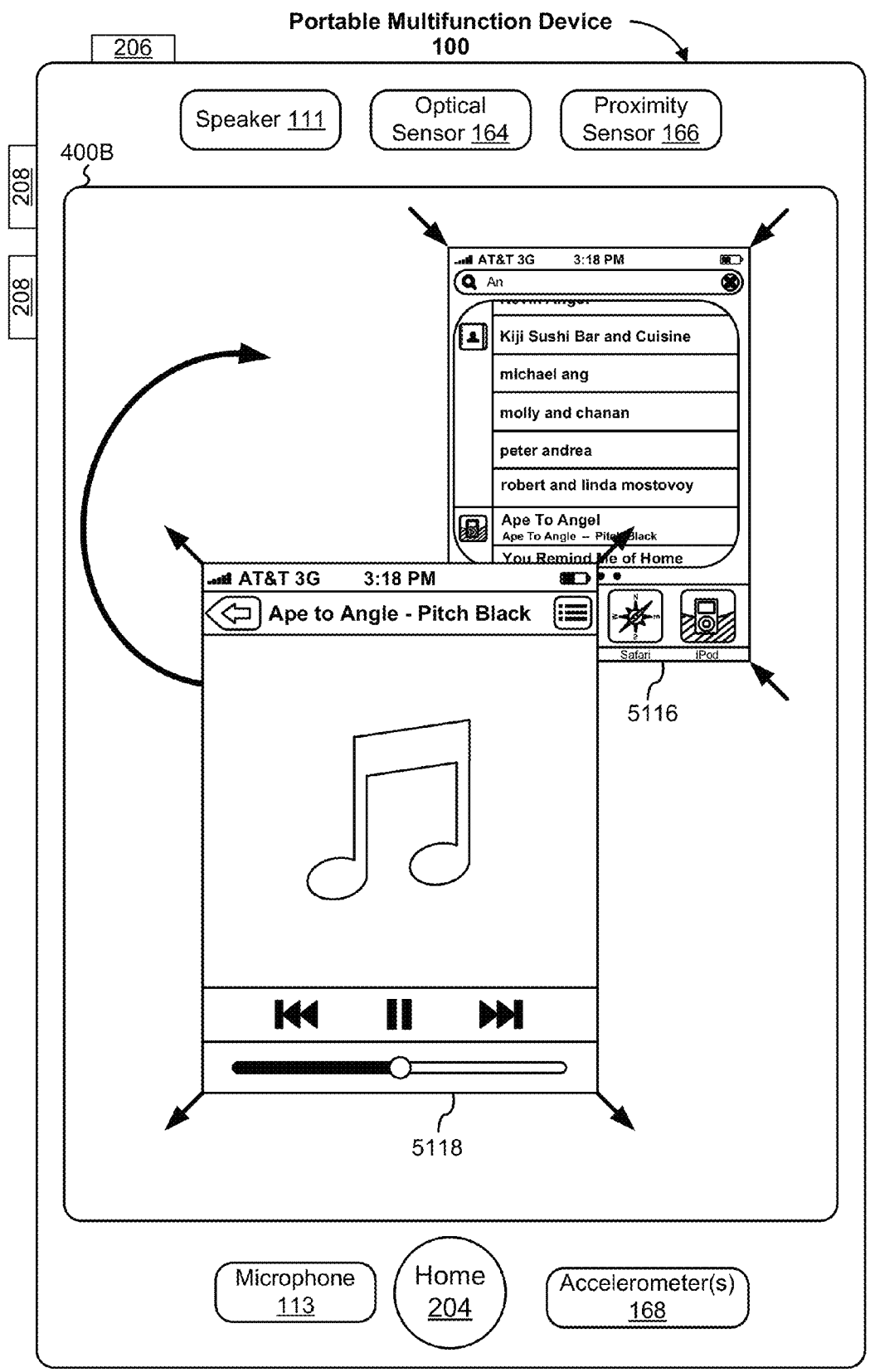
Figure 5U:
Figure 5V:
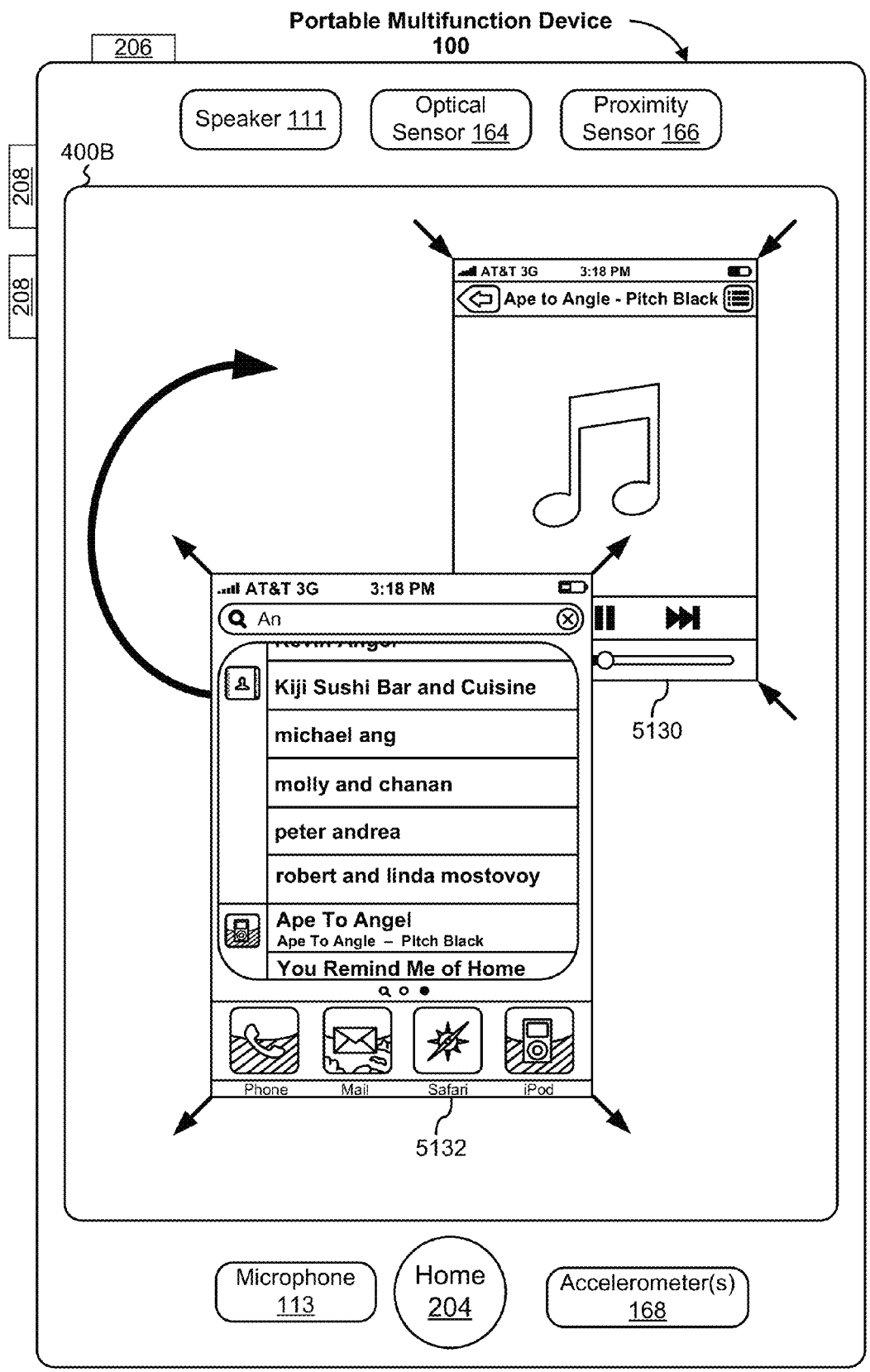
Figure 5W:
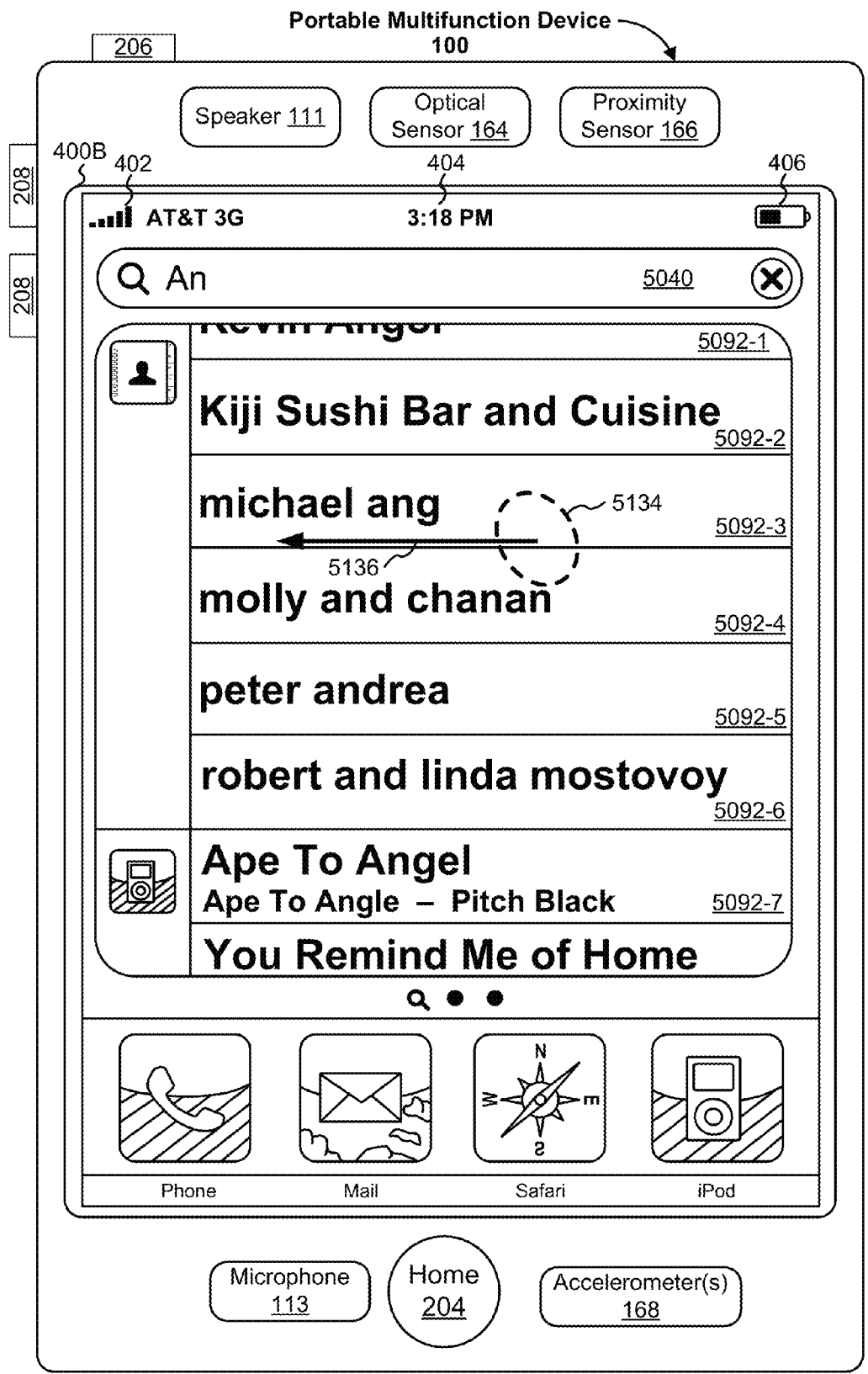
Figure 5X:
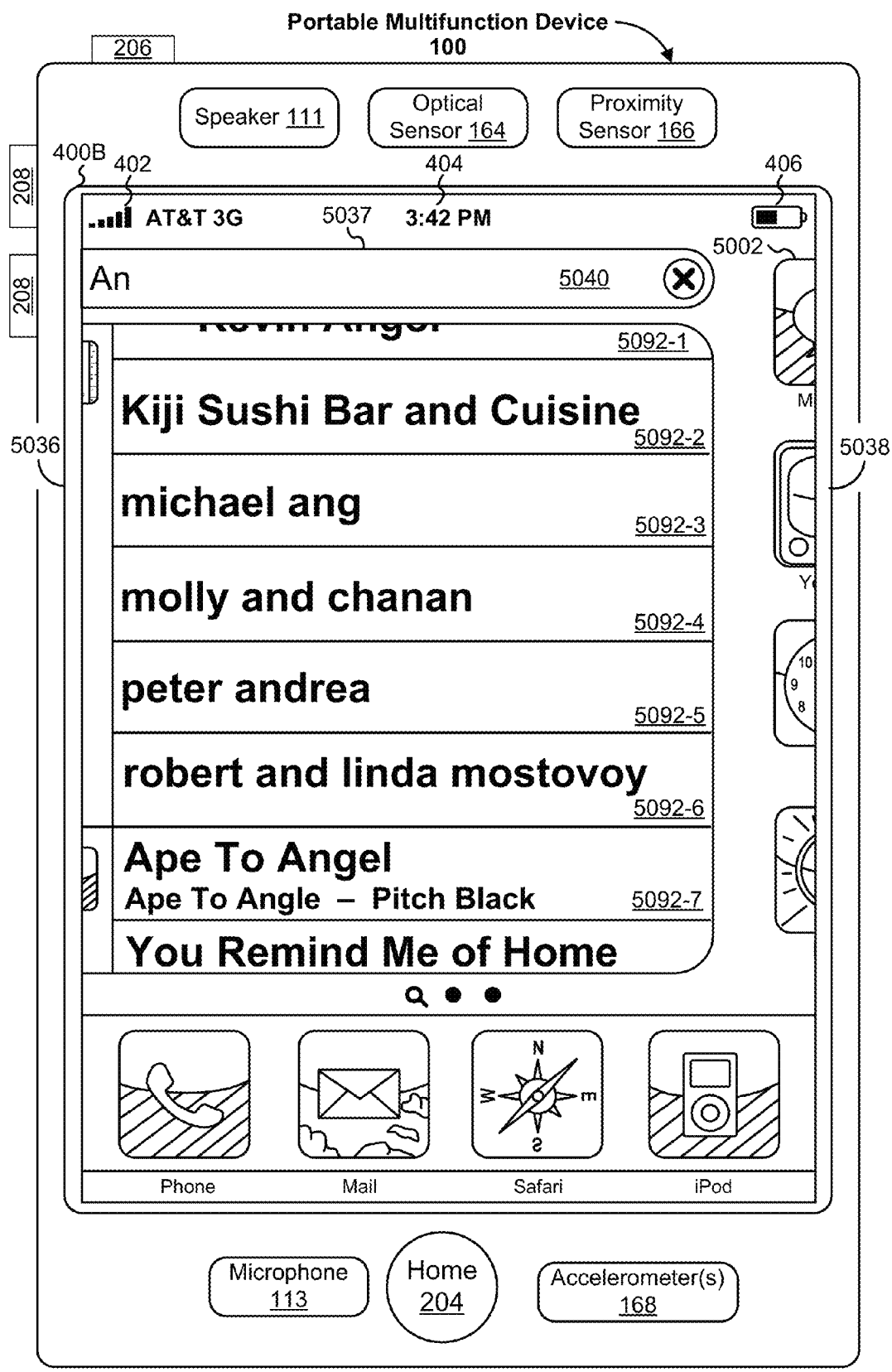
Figure 5Y:
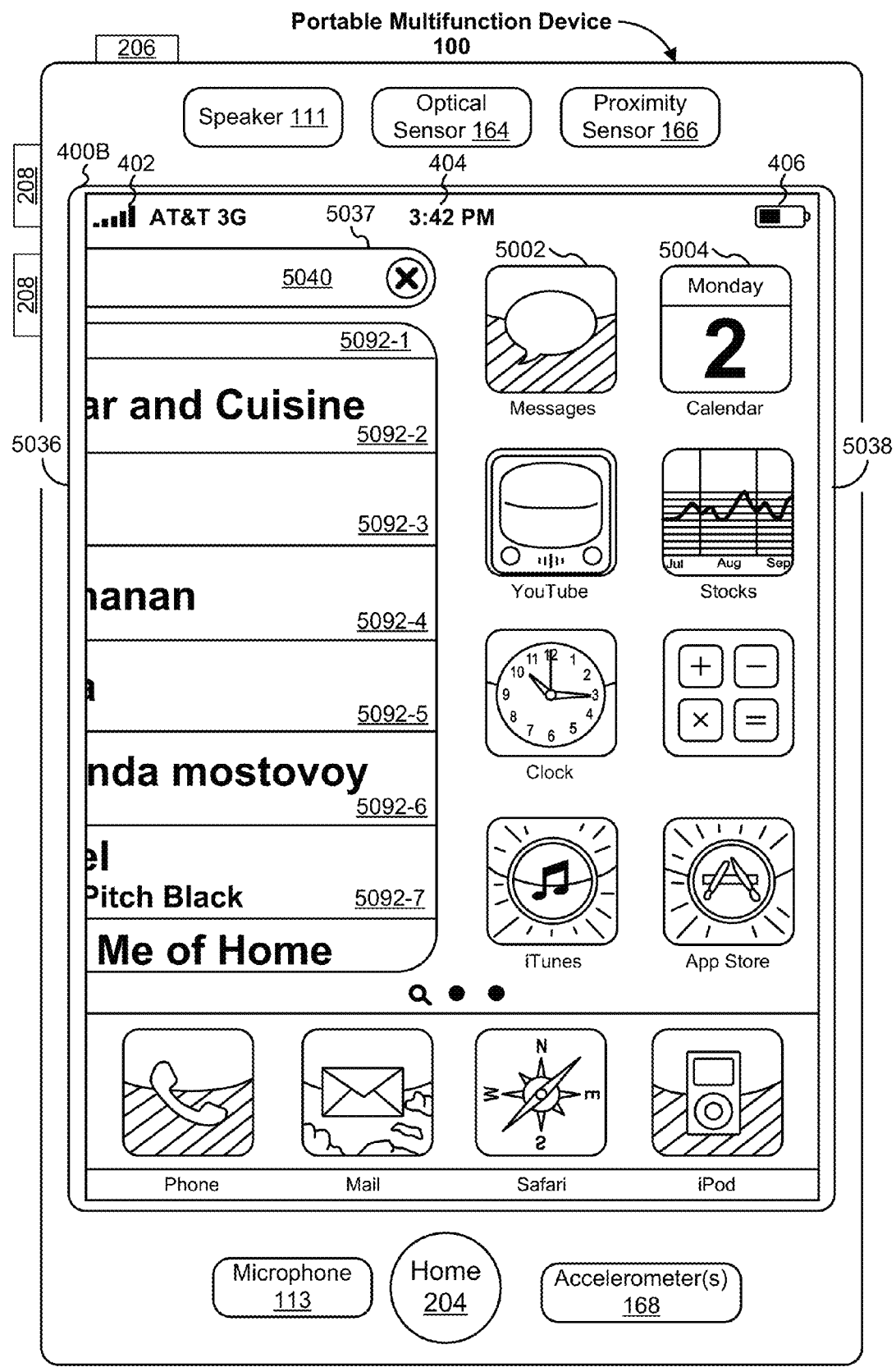
Figure 6A:
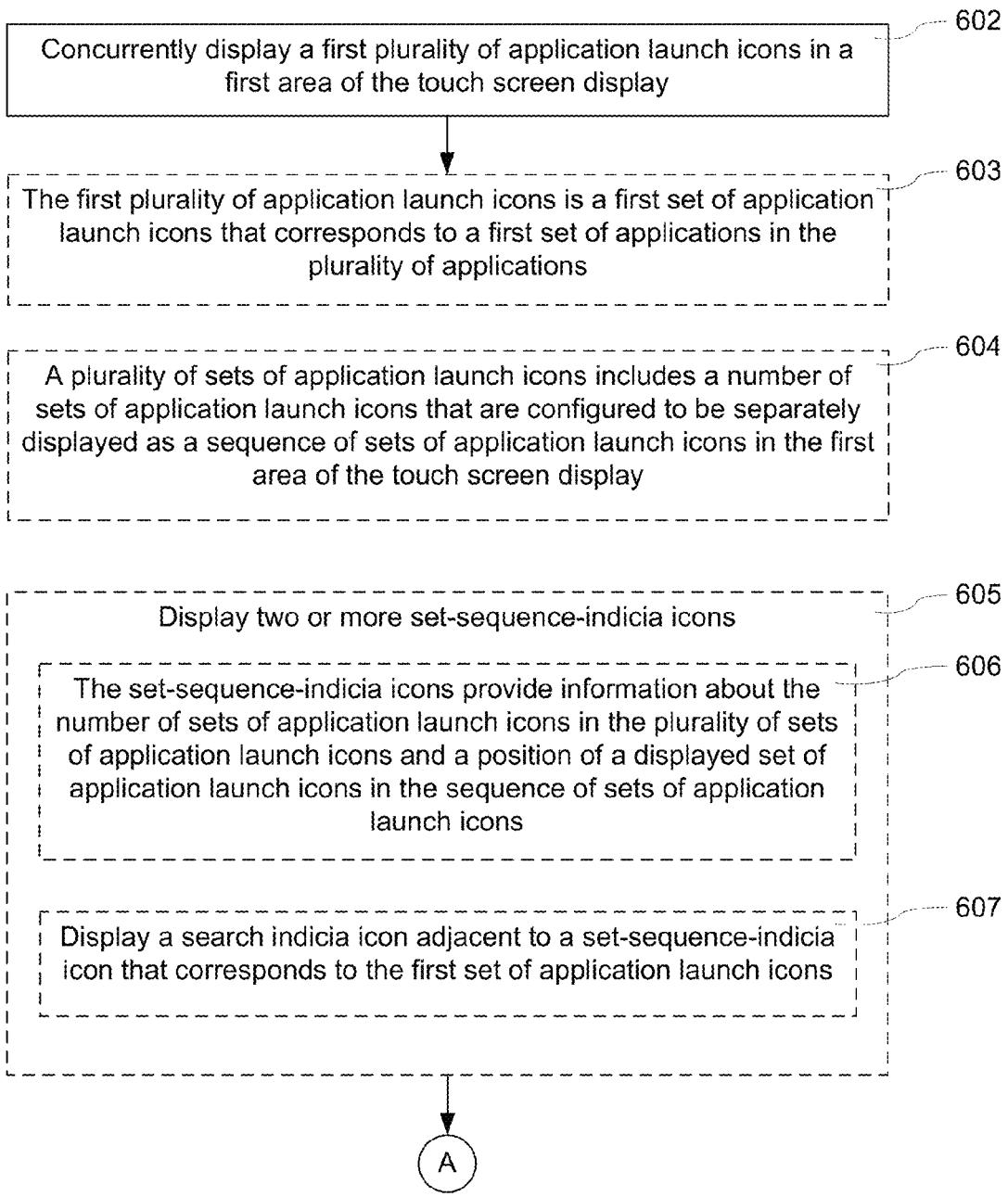
FIGS. 6A-6K are flow diagrams illustrating a method for performing integrated searches and accessing data associated with a plurality of applications in accordance with some embodiments.
Figure 6B:
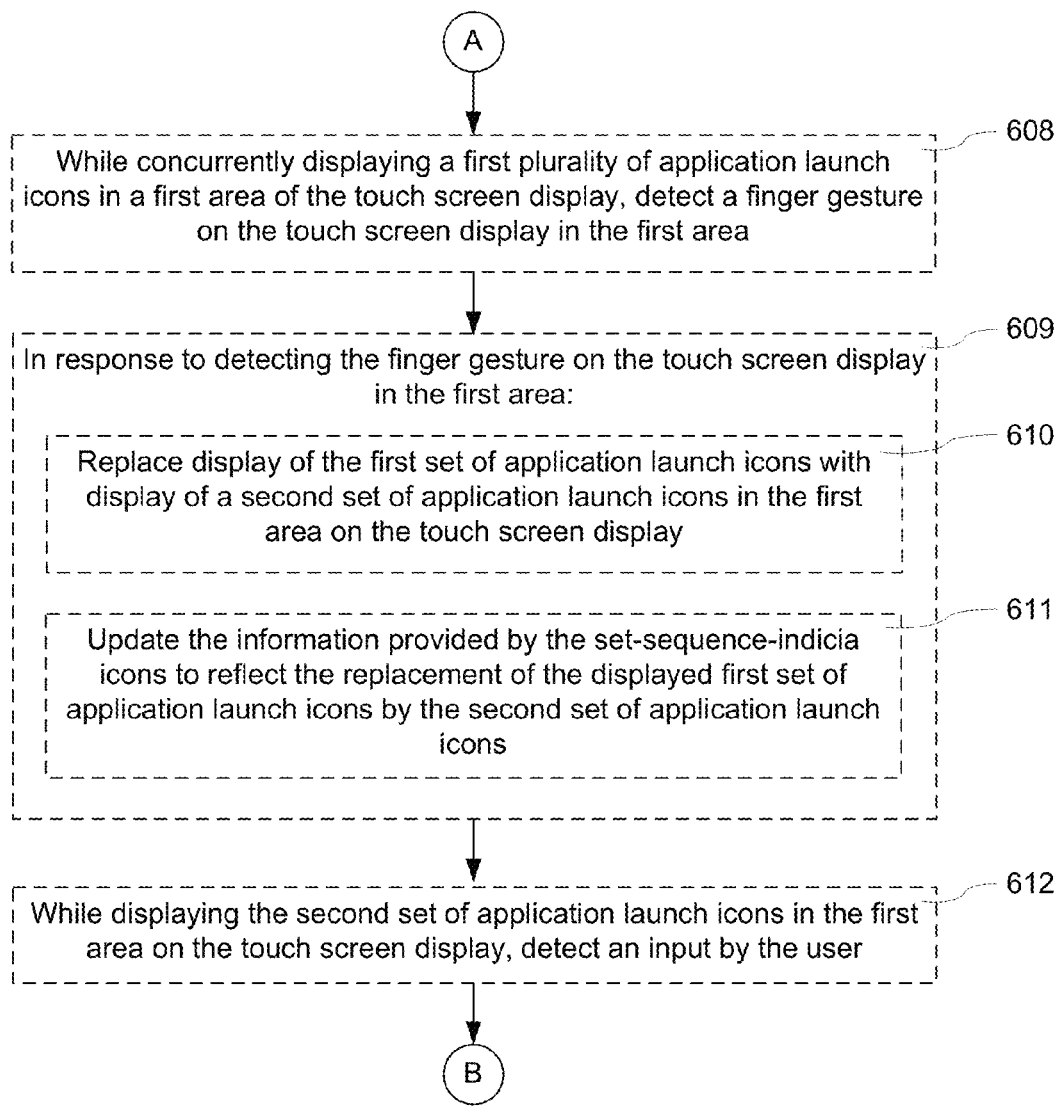
Figure 6C:
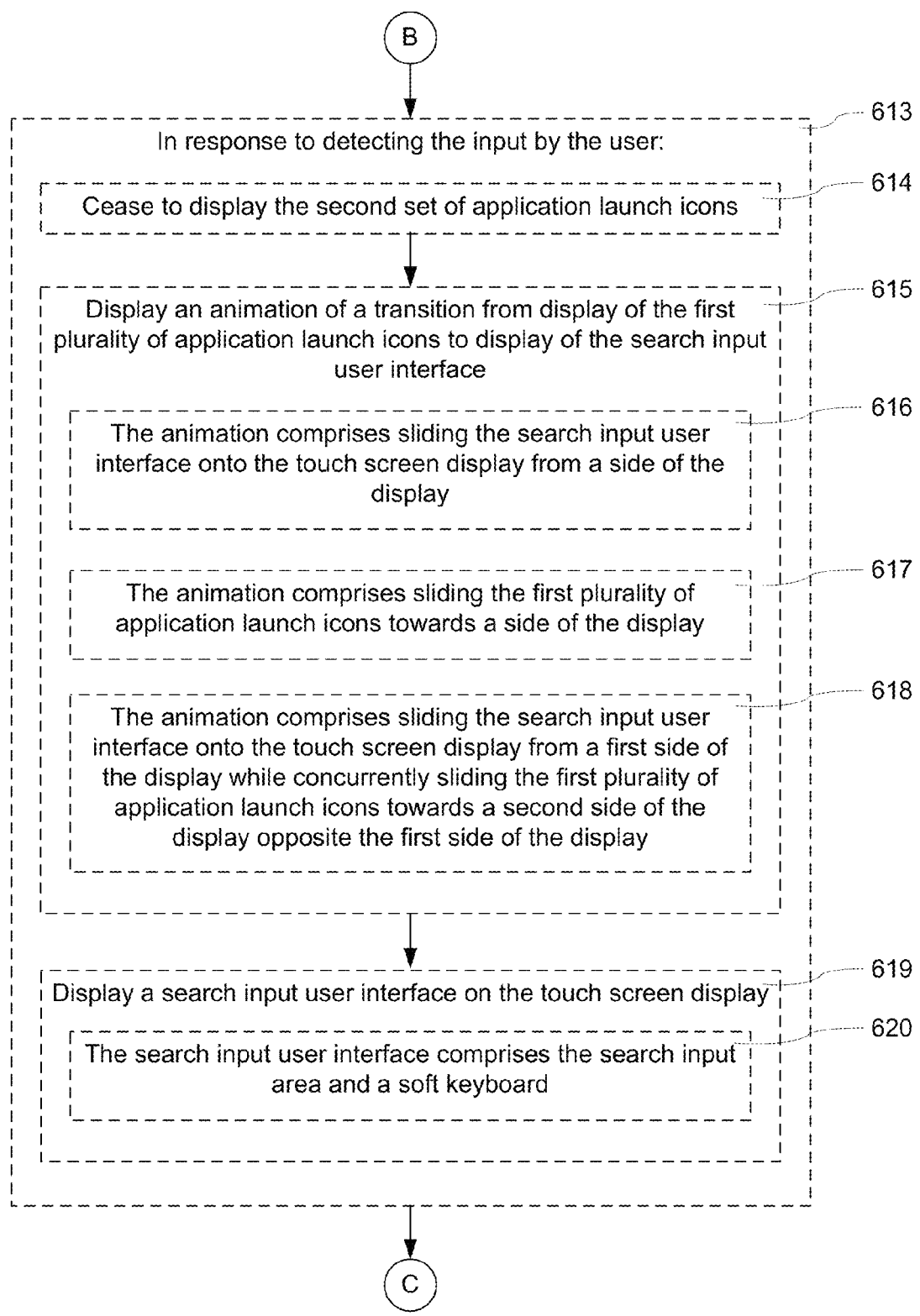
Figure 6D:
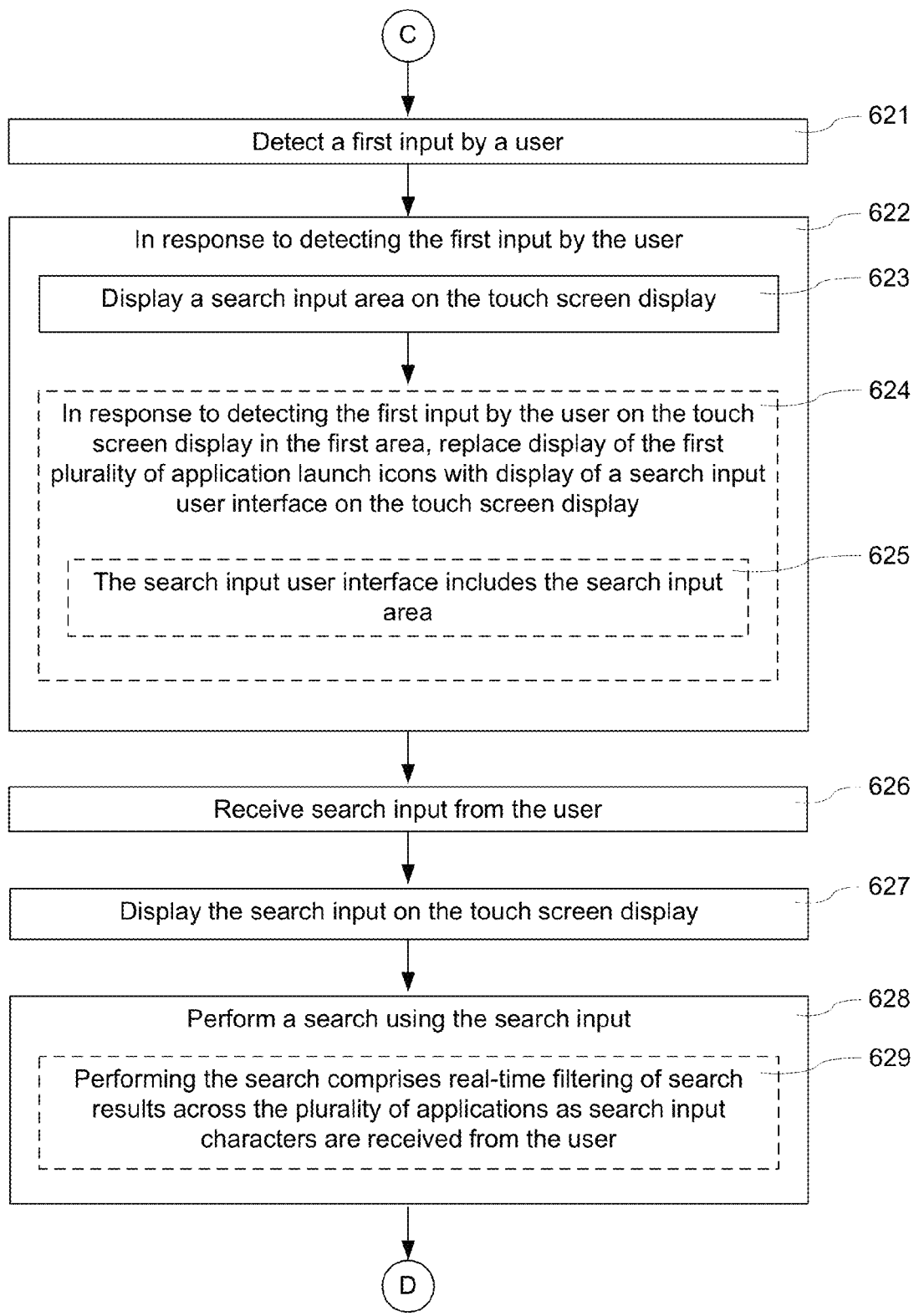
Figure 6E:
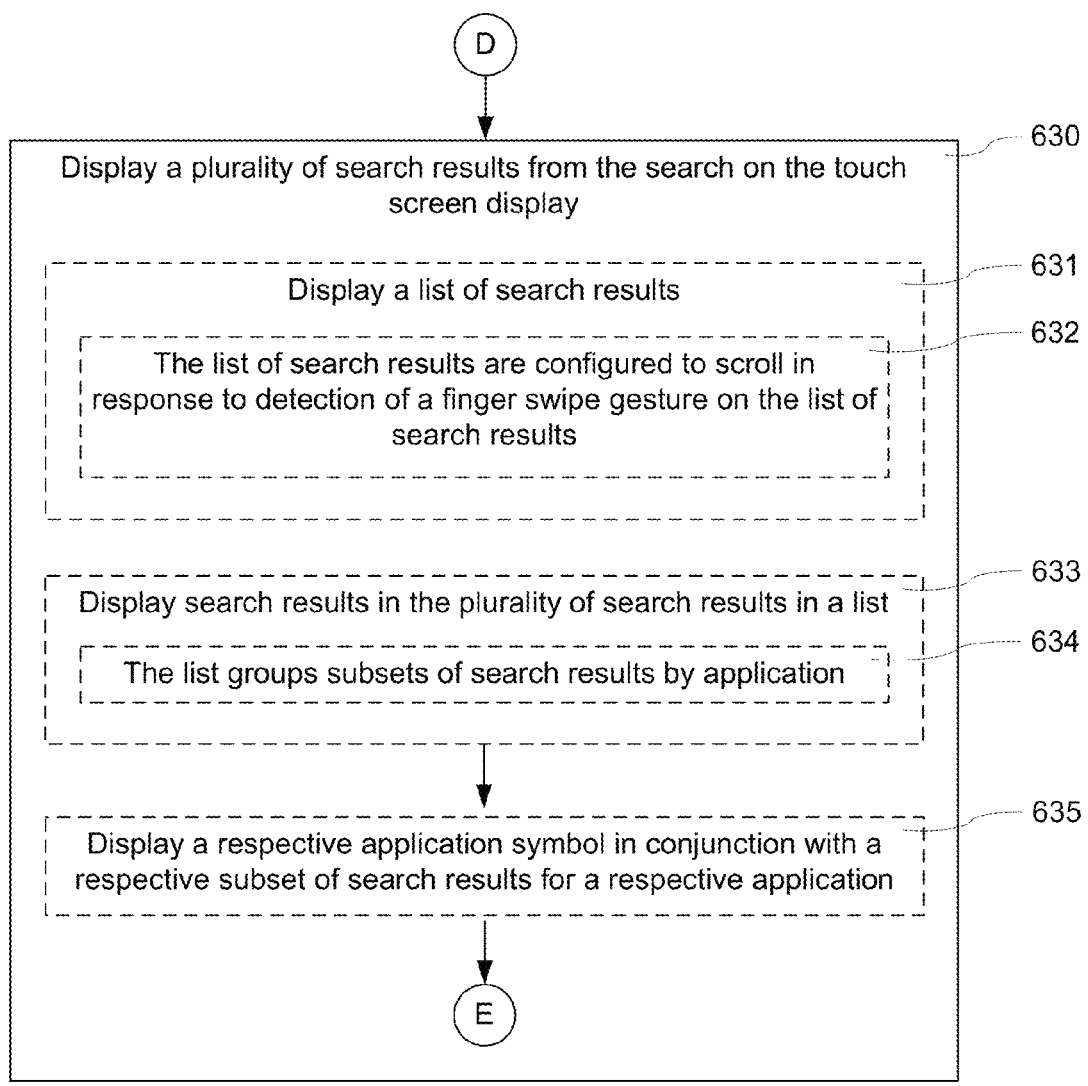
Figure 6F:
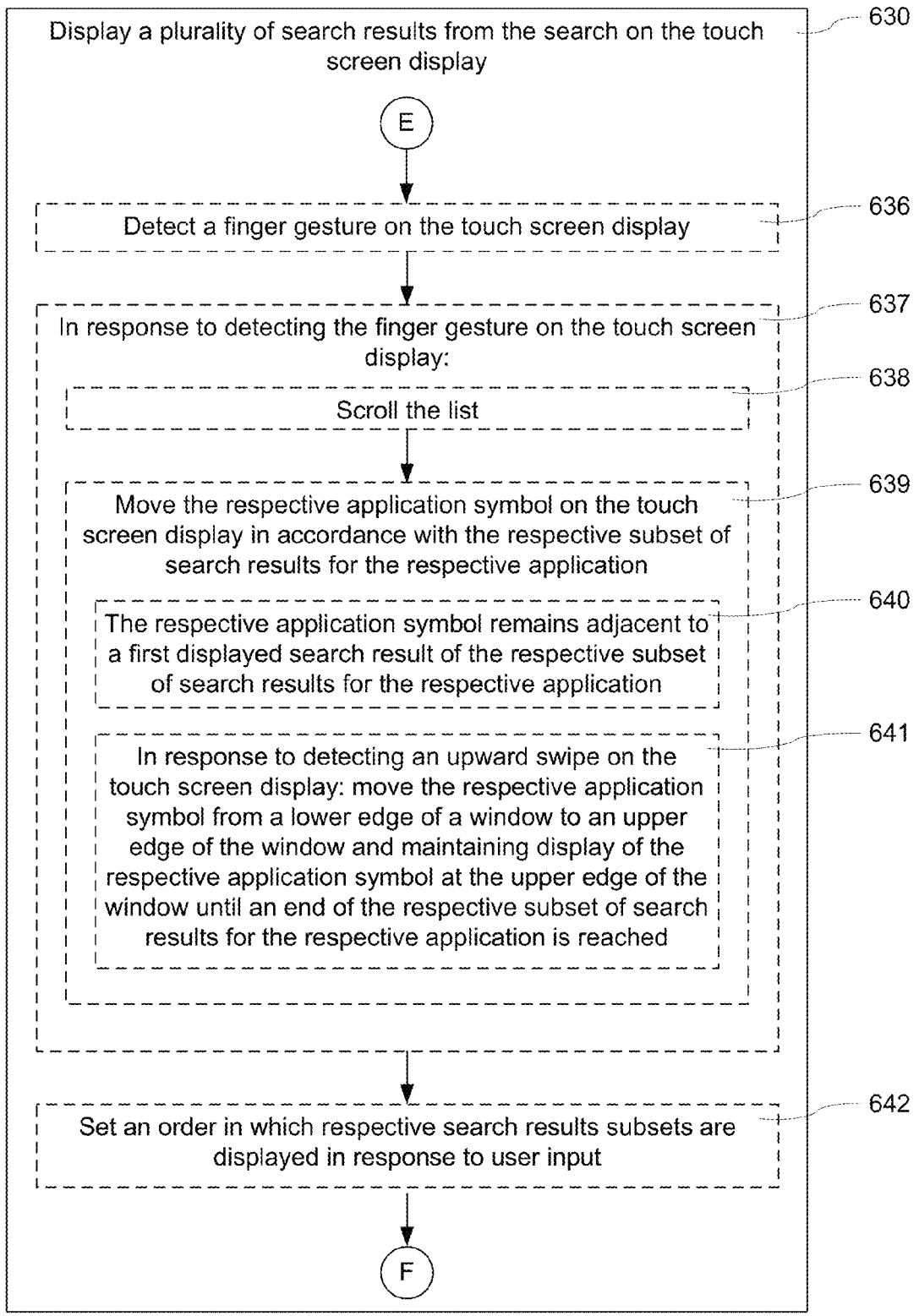
Figure 6G:
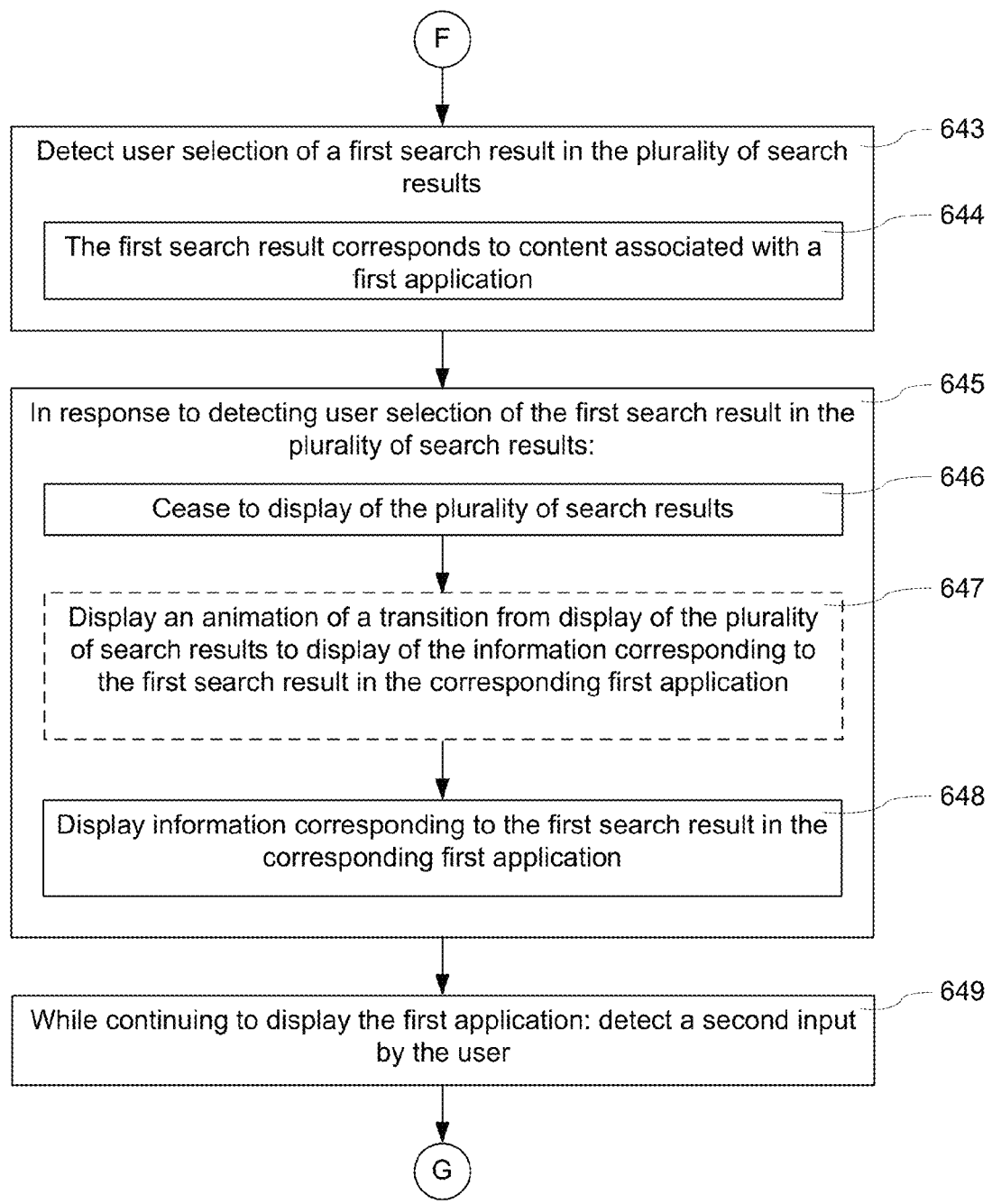
Figure 6H:
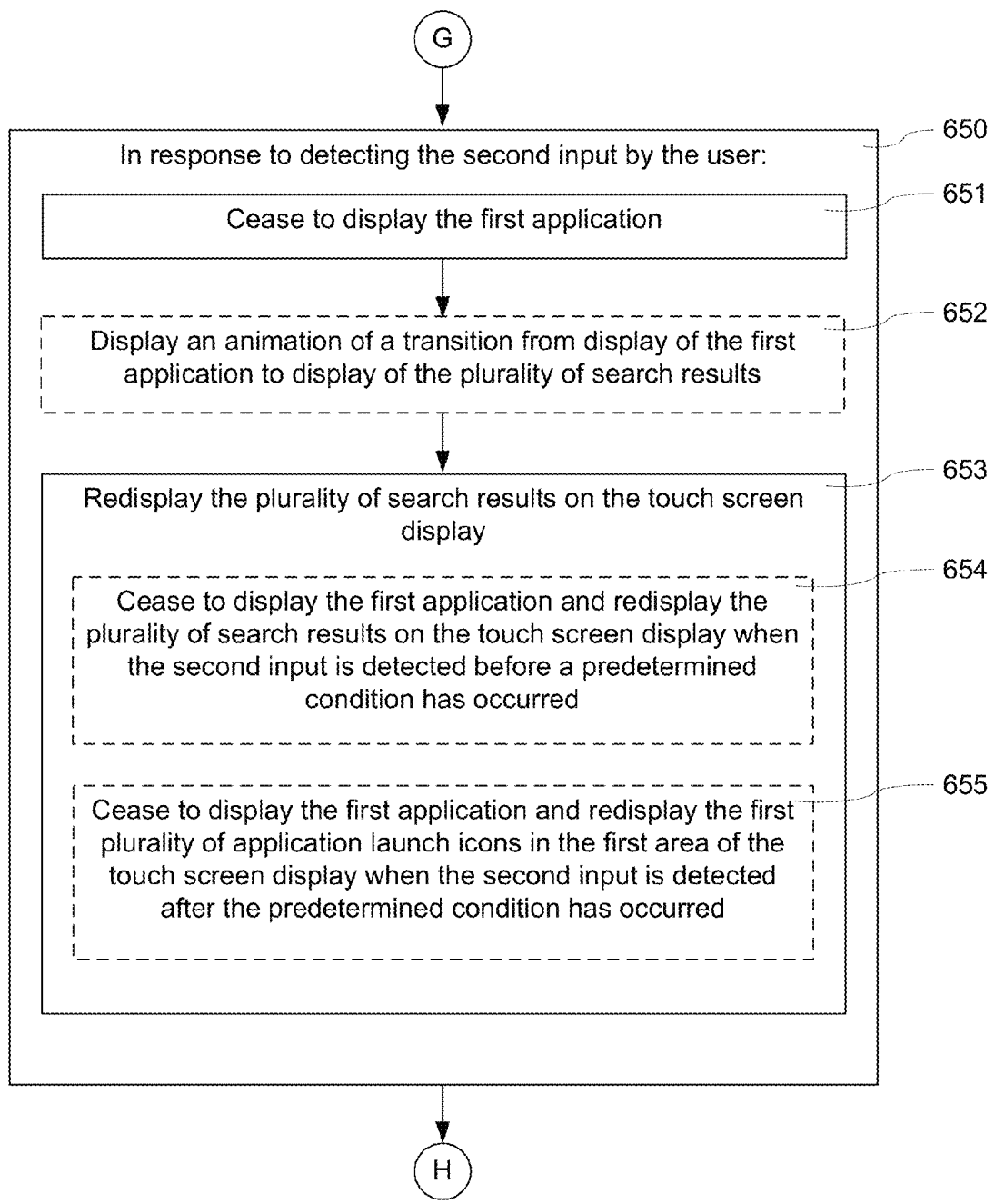
Figure 6I:
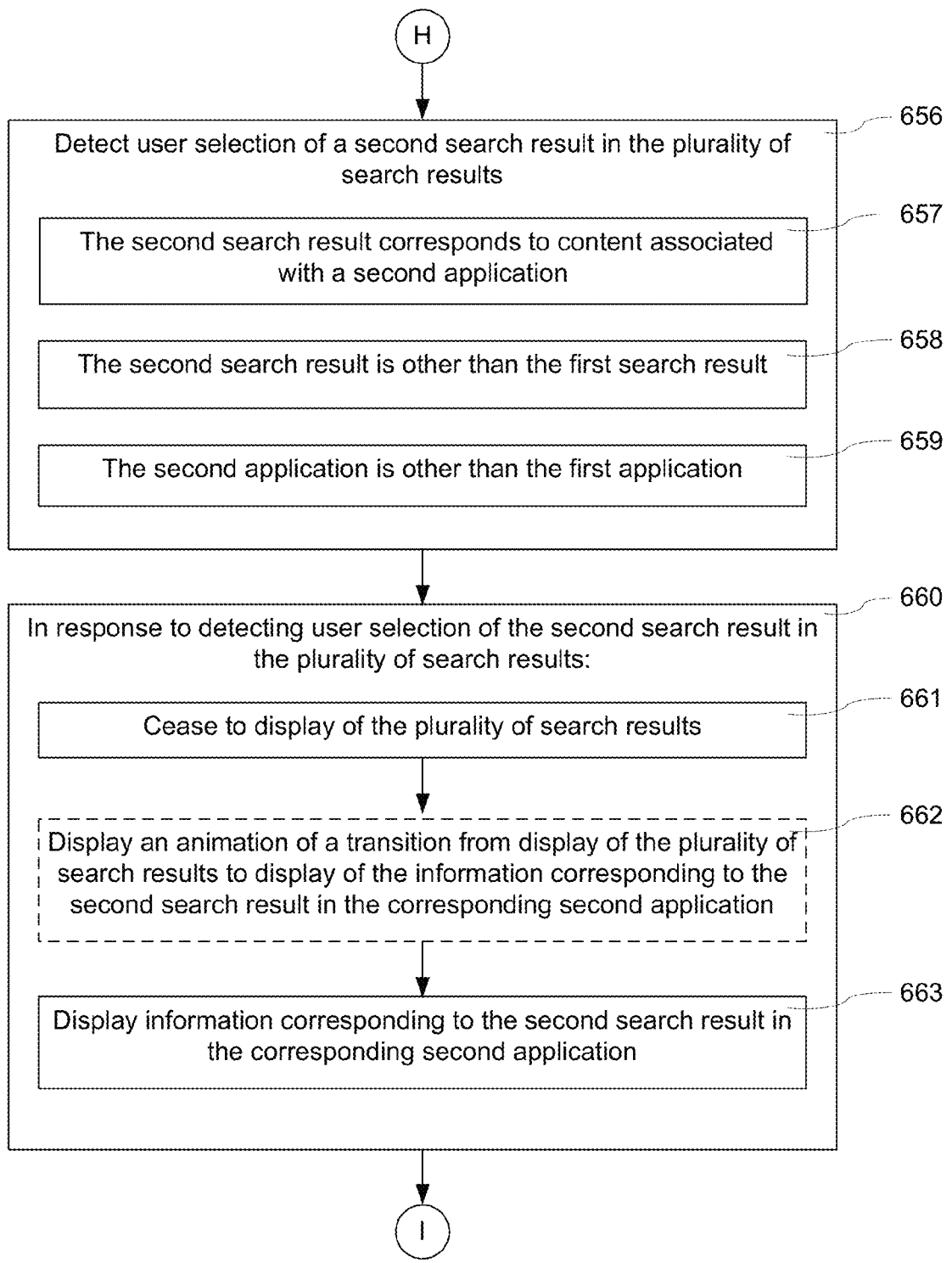
Figure 6J:
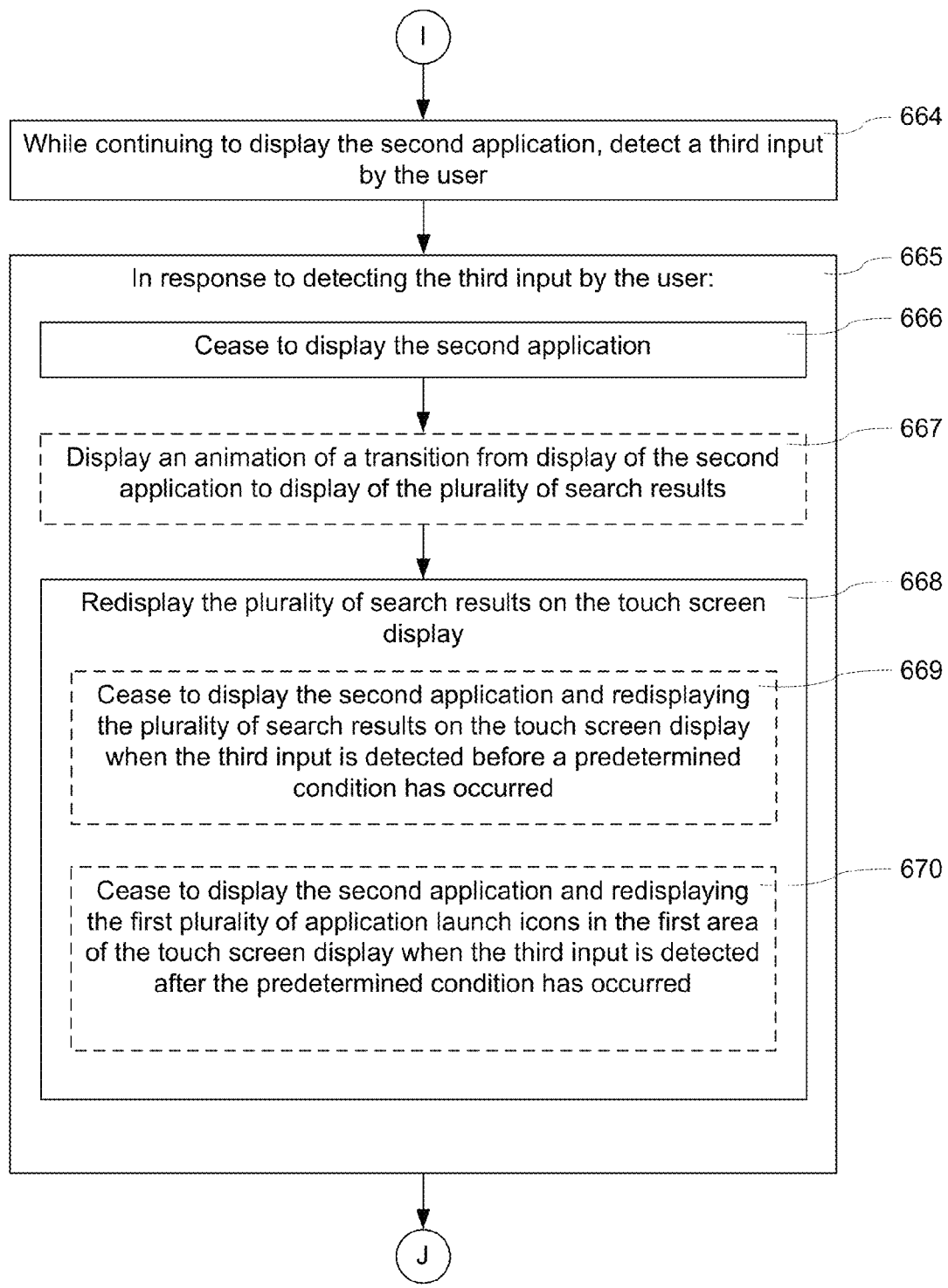
Figure 6K:
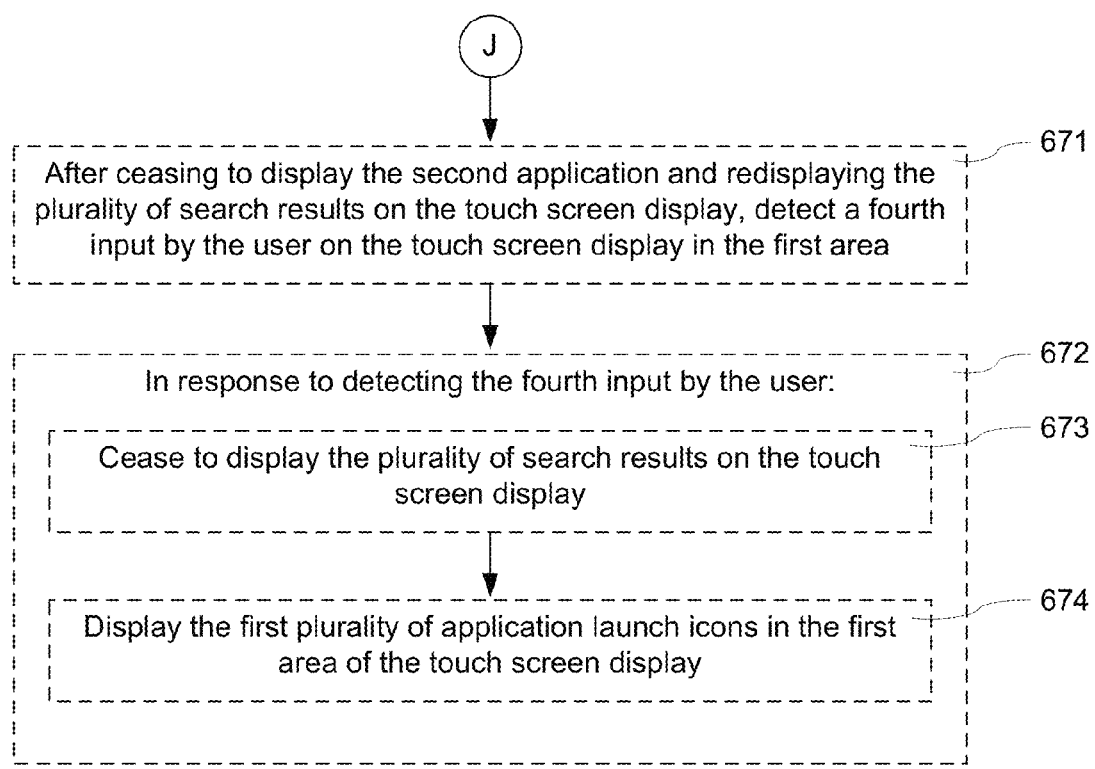

FIGS. 5A-5Y illustrate exemplary user interfaces for performing integrated searches and accessing data associated with a plurality of applications in accordance with some embodiments. The user interfaces in these figures are used to illustrate the processes described below with respect to FIGS. 6A-6K.

FIGS. 5A-5G illustrate user interfaces for initially displaying a plurality of application launch icons and displaying a search input interface. FIGS. 5A-5C illustrate a plurality of application launch icons 5002, 5004, 5006, 5008 and user gestures to initiate display of a search input interface (e.g., 5030 in FIG. 5B; 5032, 5034 in FIG. 5C; or 5044, 5046 in FIG. 5G). FIGS. 5D-5E illustrate an animated transition from the plurality of launch icons to a search input interface. FIG. 5F illustrates the search input interface 5037.

FIGS. 5H-5K illustrate performing a search using the search input interface. FIG. 5H illustrates entering search input 5048 into a search input area 5048 using a soft keyboard. FIG. 5I illustrates displaying search results in accordance with some embodiments. FIGS. 5I-5K illustrate scrolling through search results in response to user input (e.g., 5056, 5058 in FIG. 5I).

FIGS. 5L-5N illustrate changing the order in which respective search results subsets are displayed in response to user input using one or more settings pages.

FIGS. 5O-5R illustrate detecting a selection of a search result associated with a first application, displaying the first application and information associated with the search result, and returning to the search results. FIG. 5O illustrates detecting user selection 5094 of a search result 5092-2. FIG. 5P illustrates an animated transition between the search results and the first application. FIG. 5Q illustrates displaying the first application 5106 along with information (e.g., 5100, 5102, 5104 in FIG. 5Q) corresponding to the selected search result. FIG. 5R illustrates a transition between the first application and the search results.

FIGS. 5S-5V illustrate detecting a selection of a search result associated with a second application, displaying the second application and information associated with the search result, and returning to the search results. FIG. 5S illustrates detecting user selection 5114 of a search result 5092-7. FIG. 5T illustrates an animated transition between the search result and the second application. FIG. 5U illustrates displaying the second application 5126 along with information (e.g., 5120, 5122, 5124 in FIG. 5U) corresponding to the selected search result. FIG. 5V illustrates a transition between the second application and the search results.

FIGS. 5W-5Y illustrate ceasing to display the search results and displaying the application launch icons. FIG. 5W illustrates detecting an input (e.g., 5134, 5136 in FIG. 5W) while displaying the search results. FIGS. 5W and 5Y illustrate an animated transition between the search results (e.g., 5092-1, 5092-2, 5092-3, 5092-4, 5092-5, 5092-6, 5092-7 in FIG. 5X) and the application launch icons (e.g., 5002, 5004 in FIG. 5Y).

FIGS. 6A-6K are flow diagrams illustrating a method for performing integrated searches and accessing data associated with a plurality of applications in accordance with some embodiments. The method 600 is performed at a multifunction device (e.g., 300, FIG. 3) with a display and a touch-sensitive surface. Some operations in method 600 may be combined and/or the order of some operations may be changed.

In some embodiments, the touch-sensitive surface is on the display. In other words, the display is a touch screen display (e.g., 112, FIG. 2). In some embodiments, the method is performed at a portable multifunction device with a touch screen display (e.g., portable multifunction device 100).

As described below, the method 600 provides a way to perform integrated searches and provide access to a plurality of applications, using a display and a touch-sensitive surface. The method reduces the cognitive burden on a user when performing searches and using applications on the multifunction device, thereby creating a more efficient human-machine interface. For battery-operated computing devices, enabling a user to perform searches faster and more efficiently conserves power and increases the time between battery charges.

The device concurrently displays (602) a first plurality of application launch icons (e.g., 5002, 5004, 5006 and 5008 in FIG. 5A) in a first area (e.g., 5010 in FIG. 5A) of the touch screen display. In some embodiments, the device also displays a second plurality of application launch icons (e.g., 5009-1, 5009-2, 5009-3, and 5009-4 in FIG. 5A) in a second area (e.g., 5012 in FIG. 5A) on the touch screen display, wherein the second area is different from the first area.

In some embodiments, the first plurality of application launch icons (e.g., 5002, 5004, 5006 and 5008 in FIG. 5A) is (603) a first set of application launch icons that corresponds to a first set of applications in the plurality of applications. In some embodiments, a plurality of sets of application launch icons includes (604) a number of sets of application launch icons that are configured to be separately displayed as a sequence of sets (e.g., a first set includes 5002, 5004, 5006 and 5008 in FIG. 5A; and a second set includes 5022, 5024, 5026 and 5028 in FIG. 5B) of application launch icons in the first area (e.g., 5010 in FIG. 5A) of the touch screen display. In some embodiments, the device displays (605) two or more set-sequence-indicia icons (e.g., 5014-1 and 5014-2 in FIG. 5A). In some embodiments, the set-sequence-indicia icons provide (606) information about the number of sets of application launch icons in the plurality of sets of application launch icons and a position of a displayed set of application launch icons in the sequence of sets of application launch icons. For example, in some embodiments, if there are two set sequence indicia icons, there are two sets of icons. In some embodiments, the device displays (607) a search indicia icon (e.g., 5016 in FIG. 5A) adjacent to a set-sequence-indicia icon that corresponds to the first set of application launch icons.

In some embodiments, the device detects (608) a finger gesture on the touch screen display in the first area (e.g., a finger swipe gesture such as a contact 5018 in FIG. 5A and a right-to-left finger swipe 5020 in FIG. 5A). In some embodiments, in response (609) to detecting the finger gesture on the touch screen display in the first area, the device replaces (610) display of the first set of application launch icons with display of a second set of application launch icons (e.g., 5022, 5024, 5026 and 5028 in FIG. 5B) in the first area on the touch screen display.

In some embodiments, in response to detecting the finger gesture on the touch screen display in the first area, the device updates (611) the information provided by the set-sequence-indicia icons to reflect the replacement of the displayed first set of application launch icons by the second set of application launch icons. For example the set-sequence-indicia icon that corresponds to the current set of application launch icons may be highlighted (e.g., the left most set-sequence-indicia icon 5014-2 in FIG. 5A or the right most set-sequence-indicia icon 5014-2 in FIG. 5B). In some embodiments, in response to detecting the finger gesture (e.g., 5020 in FIG. 5A) on the touch screen display in the first area (e.g., 5010 in FIG. 5A), the device replaces display of the first set of application launch icons (e.g., 5002, 5004, 5006 and/or 5008 in FIG. 5A) with display of a second set of application launch icons (e.g., 5022, 5024, 5026 and 5028 in FIG. 5B) in the first area (e.g., 5010 in FIG. 5B) on the touch screen display, updates the information provided by the set-sequence-indicia icons (e.g., 5014-2 is highlighted), and maintains the display of the second plurality of application launch icons in the second area on the touch screen display.

In some embodiments, while displaying the second set of application launch icons in the first area on the touch screen display, the device detects (612) an input by the user (e.g., activation of a physical button such as a home menu button or a soft menu button by a single click). For example in FIG. 5B, the device detects a contact 5030 with a home button 204 and in response (613) to detecting the input by the user, the device ceases (614) to display the second set of application launch icons (e.g., the device displays a search input user interface, as illustrated in FIG. 5F). In some embodiments, while displaying the first plurality of launch icons the device detects a finger gesture on the touch screen display in the first area (e.g., a finger swipe gesture such as a contact 5032 in FIG. 5C and a left-to-right finger swipe 5034 in FIG. 5C).

In some embodiments, the device displays (615) an animation of a transition from display of the first plurality of application launch icons to display of the search input user interface (e.g., the animation illustrated sequentially in FIGS. 5C, 5D, 5E and 5F). In some embodiments, this animation is also displayed when the device is displaying a second set of application launch icons and detects an input by the user (e.g., 5030 in FIG. 5B). In some embodiments, the animation comprises (616) sliding the search input user interface (e.g., 5037 in FIG. 5D) onto the touch screen display from a side of the display (e.g., 5036 in FIG. 5D). In some embodiments, the animation comprises (617) sliding the first plurality of application launch icons (e.g., 5002, 5004 and 5006 in FIG. 5D) towards a side of the display (e.g., 5038 in FIG. 5D). In some embodiments, the animation comprises (618) sliding the search input user interface (e.g., 5037 in FIG. 5D) onto the touch screen display from a first side of the display while concurrently sliding the first plurality of application launch icons towards a second side of the display opposite the first side of the display (e.g., as shown in FIGS. 5D, 5E and 5F). In some embodiments the animation includes sliding the search input user interface (e.g., 5037 in FIG. 5G) onto the screen from the top of the screen while sliding the plurality of application launch icons towards a bottom of the screen after detecting a user gesture (e.g., contact 5041 and downward swipe 5043 in FIG. 5G).

In some embodiments the device displays (619) a search input user interface (5037 in FIG. 5F or 5037 in FIG. 5G) on the touch screen display. In some embodiments, the search input user interface comprises (620) the search input area (e.g., 5040 in FIG. 5F) and a soft keyboard (e.g., 5042 in FIG. 5F).

The device detects (621) a first input by a user. For example, the input may be a finger gesture, such as a left-to-right finger swipe gesture (e.g., 5034 in FIG. 5C), a vertically downward swipe gestures (e.g., contact 5041 in FIG. 5G and detected downward movement 5043 in FIG. 5G), or other predefined user action on the touch screen display in the first area. In response (622) to detecting the first input by the user, the device displays (623) a search input area (e.g., 5040 in FIG. 5F or 5040 in FIG. 5G) on the touch screen display. In some embodiments, in response to detecting the first input by the user on the touch screen display in the first area, the device replaces (624) display of the first plurality of application launch icons with display of a search input user interface (e.g., 5037 in FIGS. 5F and 5G) on the touch screen display. In some embodiments, the search input user interface includes (625) the search input area (e.g., 5040 in FIGS. 5F and 5G). In some embodiments, a keyboard (e.g., 5042 in FIG. 5F) is displayed when the device detects a contact in the search input area (e.g., 5040 in FIG. 5G).

The device receives (626) search input from the user (e.g., detecting finger tap gestures on text characters and other symbols in a soft keyboard). For example, in FIG. 5H, the device detects input including a first contact 5044 with the letter "s" and a second contact 5046 with the letter "u." The device displays (627) the search input on the touch screen display (e.g., the letters "su" are displayed in the search input area 5040, FIG. 5H).

The device performs (628) a search using the search input. In some embodiments, searching is performed as described in U.S. patent application Ser. No. 12/400,763, "Search Capability Implementation for a Device," filed Mar. 9, 2009, which is incorporated by reference herein in its entirety. In some embodiments, performing the search comprises (629) real-time filtering of search results across the plurality of applications as search input characters are received from the user. For example, the device performs real-time filtering as search characters (e.g., "su" 5048 in FIG. 5H) are entered. For example in FIG. 5H, results matching the search characters (e.g., "Claire GaiaRose SunSpiral" 5050-1, "Kiji Sushi Bar and Cuisine" 5050-2, "Vytas SunSpiral" 5050-3 and "Random Summer" 5050-4) are displayed. In some embodiments, when contact (e.g., 5052 in FIG. 5H) is detected on region of the touch screen display that corresponds to a "search" button (e.g., 5054 in FIG. 5H) a full search is performed. In some embodiments, when contact (e.g., 5052 in FIG. 5H) is detected on region of the touch screen display that corresponds to a "search" button (e.g., 5054 in FIG. 5H) the keyboard 5042 is hidden (as shown in FIG. 5I), and additional results (e.g., 5050-5, 5050-6, 5050-7 in FIG. 5I) are displayed.

The device displays (630) a plurality of search results (e.g., 5050-1, 5050-2, 5050-3, 5050-4, 5050-6, 5050-7 in FIG. 5I) from the search on the touch screen display. In some embodiments, the search indicia icon (e.g., 5016 in FIG. 5I) is highlighted when the search user interface is displayed. In some embodiments, displaying the plurality of search results comprises displaying (631) a list of search results (e.g., 5050-1 through 5050-7 in FIG. 5I), wherein the list of search results are configured (632) to scroll in response to detection of a finger swipe gesture (e.g., contact 5056 and upward swipe 5058 in FIG. 5I) on the list of search results.

In some embodiments, the device displays (633) search results in the plurality of search results in a list. In some embodiments, the list groups (634) subsets of search results by application. For example, in FIG. 5I the top three results in the list "Claire GaiaRose SunSpiral" 5050-1, "Kiji Sushi Bar and Cuisine" 5050-2 and "Vytas SunSpiral" 5050-3 are all contacts of the user and are associated with the address book application; the bottom four results "Random Summer 5050-4, "Brownsville Turnaround" 5050-5, "Pulling out of Ricardo" 5050-6, and "Six Hours to Louisiana" 5050-7 are media content and are associated with a media player application. In some embodiments, the device displays (635) a respective application symbol (e.g., an address book application symbol 5060 in FIG. 5I or a media player symbol 5062 I FIG. 5I) in conjunction with a respective subset (e.g., the address book application symbol 5060 is displayed in conjunction with the address book entries 5050-1, 5050-2 and 5050-3 in FIG. 5I) of search results for a respective application.

In some embodiments, the device detects (636) a finger gesture on the touch screen display (e.g., a finger swipe gesture such as an upward swipe). In some embodiments, in response (637) to detecting the finger gesture (e.g., contact 5056 and upward swipe 5058 in FIG. 5I) on the touch screen display, the device scrolls (638) the list (as shown in FIG. 5J, where "Claire GaiaRose SunSpiral" 5050-1 has moved off of the screen, while "My Kingdom (Part 1)" 5050-8 has moved onto the screen).

In some embodiments, the device moves (639) the respective application symbol on the touch screen display in accordance with the respective subset of search results for the respective application (e.g., in FIGS. 5I and 5J, the media player application symbol 5062 stays with the top media result "Random Summer" 5050-4 even as the list scrolls upwards). In some embodiments, the respective application symbol remains (640) adjacent to a first displayed search result of the respective subset of search results for the respective application. For example, in FIG. 5I, "Claire GaiaRose SunSpiral" 5050-1 was the first displayed contact and the address book application symbol 5060 was adjacent to "Claire GaiaRose SunSpiral" 5050-1. In FIG. 5J "Claire GaiaRose SunSpiral" 5050-1 has moved off the screen and "Kiji Sushi Bar and Cuisine" 5050-2 is the first displayed search result of the respective subset of contacts, and thus the address book application symbol 5060 is displayed adjacent to "Kiji Sushi Bar and Cuisine" 5050-2.

In some embodiments, in response to detecting an upward swipe on the touch screen display, the device moves (641) the respective application symbol from a lower edge of a window to an upper edge of the window and maintains display of the respective application symbol at the upper edge of the window until an end of the respective subset of search results for the respective application is reached. For example, in FIGS. 5I and 5J, the address book application symbol 5060 is displayed at the top of the screen, however when the last result "Vytas SunSpiral" 5050-3 in the subset that is associated with the address book application symbol 5060 scrolls off the screen (as shown in FIG. 5K), the address book application symbol 5060 also scrolls off the screen, and is replaced by the media player application symbol 5062. Although address book application symbol 5060 was used in this example, it should be understood that in some embodiments, a similar operation is performed to one or more additional application symbols as the subset of results associated with the application symbol scroll off of the screen.

In some embodiments, the device sets (642) an order in which respective search results subsets are displayed in response to user input. In some embodiments, the device may be configured (e.g., with a settings page) such that search results for some applications are not displayed. For example, the device detects input (e.g., contacts 5064, 5066 and 5068 in FIG. 5L) with the touch screen display that indicates that the search results associated with those subsets are not to be displayed. For example, in FIG. 5N applications 5086, podcasts 5088, video 5090 search results have been selected to not be displayed at all. In some embodiments, the user may configure the order in which respective search results subsets are displayed by application, and even whether respective search results are displayed. For example, as illustrated in FIGS. 5L-5N, a setting page may be used to set the order in which search result subsets are displayed. In some embodiments, the device detects input (e.g., contact 5070 and upward swipe 5072 in FIG. 5M) with the touch screen display that indicates the order in which the subsets are to be displayed. For example, in FIG. 5N the device is configured such that music 5074 search results displayed first, contacts 5076 search results displayed second, mail 5078 search results displayed third, audio books 5080 search results displayed fourth, notes 5082 search results displayed fifth and calendar 5084 search results displayed sixth.

The device detects (643) user selection of a first search result in the plurality of search results (e.g., a finger gesture, such as a tap gesture or other predefined user action on the first search result). For example, in FIG. 5O, the device detects a tap gesture (e.g., contact 5094 on "Kiji Sushi Bar and Cuisine" 5092-2 in FIG. 5O). The first search result (e.g., contact 5094 on "Kiji Sushi Bar and Cuisine" 5092-2 in FIG. 5O) corresponds (644) to content associated with a first application (e.g., an address book application).

In response (645) to detecting user selection (e.g., contact 5094 in FIG. 5O) of the first search result in the plurality of search results, the device ceases (646) to display of the plurality of search results. In some embodiments, the device displays (647) an animation of a transition from display of the plurality of search results to display of the information corresponding to the first search result in the corresponding first application. For example, representation of the search results (e.g., 5096 in FIG. 5P) is reduced in size (e.g., from the original size to half the original size) while a representation of the application (e.g., a representation of an address book 5098 in FIG. 5P) is increased in size (e.g., from an original size to twice the original size).

The device displays (648) information (e.g., a phone number 5100, a website 5102, and/or an address 5104 in the address book application 5106 in FIG. 5Q) corresponding to the first search result (e.g., "Kiji Sushi Bar and Cuisine" 5092-2 in FIG. 5O) in the corresponding first application (e.g., address book 5106 in FIG. 5Q). While continuing to display the first application (e.g., 5106 in FIG. 5Q), the device detects (649) a second input by the user (e.g., activation of a physical button such as a home menu button 204 or a soft menu button by a single click or a double click). For example, the device detects a contact 5108 in FIG. 5Q with a home button 204.

In response (650) to detecting the second input by the user, the device ceases (651) to display the first application. In some embodiments, the device displays (652) an animation of a transition from display of the first application to display of the plurality of search results. For example, representation of the application (e.g., a representation of an address book 5110 in FIG. 5R) is reduced in size (e.g., from the original size to half the original size) while a representation of the search results (e.g., 5112 in FIG. 5R) is increased in size (e.g., from an original size to twice the original size).

The device redisplays (653) the plurality of search results on the touch screen display. In some embodiments, in response to detecting the third input by the user the device, the device ceases (654) to display the first application and redisplaying the plurality of search results (e.g., 5092-1, 5092-2, 5092-3, 5092-4, 5092-5, 5092-6, 5092-7 in FIG. 5S) on the touch screen display when the second input (e.g., contact 5108 in FIG. 5Q with a home button 204) is detected before a predetermined condition has occurred. In some embodiments, the device ceases (655) to display the first application and redisplays the first plurality of application launch icons (e.g., 5002, 5004, 5006, 5008 in FIG. 5A) in the first area of the touch screen display when the second input (e.g., contact 5108 in FIG. 5Q with a home button 204) is detected after the predetermined condition has occurred. In some embodiments, the predetermined condition is whether a predetermined time period has elapsed (e.g., the condition has occurred if one minute has elapsed between when the user selection of the first search result was detected and when the second input was detected). In some embodiments the predetermined condition is that a predetermined set of one or more actions have occurred (e.g., the condition has occurred if the user has performed a specified number of inputs in the first application before the second input is detected).

The device detects (656) user selection of a second search result (e.g., 5092-6 in FIG. 5S) in the plurality of search results (e.g., a finger gesture, such as a tap gesture or other predefined user action on the second search result). For example, the device detects contact (e.g., 5114 with "Ape to Angel" in FIG. 5S). The second search result corresponds (657) to content associated with a second application (e.g., a media player application). The second search result is (658) other than the first search result (e.g., "Ape to Angel" 5092-7 is not "Kiji Sushi Bar and Cuisine" 5092-2). The second application is (659) other than the first application (e.g., a media player application 5126 in FIG. 5U is not the address book application 5106 in FIG. 5Q).

In response (660) to detecting user selection of the second search result (e.g., "Ape to Angel" 5092-7 in FIG. 5S) in the plurality of search results, the device ceases (661) to display of the plurality of search results. In some embodiments, the device displays (662) an animation of a transition from display of the plurality of search results to display of the information corresponding to the second search result in the corresponding second application. For example, representation of the search results (e.g., 5116 in FIG. 5T) is reduced in size (e.g., from the original size to half the original size) while a representation of the application (e.g., a representation of a media player 5118 in FIG. 5T) is increased in size (e.g., from an original size to twice the original size).

The device displays (663) information (e.g., song title 5120, song artist 5122, and current playback position 5124 in FIG. 5U) corresponding to the second search result (e.g., "Ape to Angel" 5092-7 in FIG. 5S) in the corresponding second application (e.g., a media player 5126 in FIG. 5U). While continuing to display the second application, the device detects (664) a third input by the user (e.g., activation of a physical button such as a home menu button or a soft menu button, which may be the same action as the second input). For example, the device detects a contact (e.g., 5128 in FIG. 5U) with a home button 204.

In response (665) to detecting the third input (e.g., contact 5128 in FIG. 5U) by the user, the device ceases (666) to display the second application (e.g., media player 5126 in FIG. 5U). In some embodiments, the device displays (667) an animation of a transition from display of the second application to display of the plurality of search results. For example, representation of the application (e.g., a representation of a media player 5132 in FIG. 5V) is reduced in size (e.g., from the original size to half the original size) while a representation of the search results (e.g., 5130 in FIG. 5V) is increased in size (e.g., from an original size to twice the original size). The device redisplays (668) the plurality of search results (e.g., 5092-1, 5092-2, 5092-3, 5092-4, 5092-5, 5092-6, 5092-7 in FIG. 5W) on the touch screen display.

In some embodiments, in response to detecting the third input by the user the device ceases (669) to display the second application and redisplaying the plurality of search results (e.g., 5092-1, 5092-2, 5092-3, 5092-4, 5092-5, 5092-6, 5092-7 in FIG. 5W) on the touch screen display when the third input (e.g., contact 5128 in FIG. 5U with a home button 204) is detected before a predetermined condition has occurred. In some embodiments, the device ceases (670) to display the second application and redisplaying the first plurality of application launch icons (e.g., 5002, 5004, 5006, 5008 in FIG. 5A) in the first area of the touch screen display when the third input (e.g., contact 5128 in FIG. 5U with a home button 204) is detected after the predetermined condition has occurred. In some embodiments, the predetermined condition is whether a predetermined time period has elapsed (e.g., the condition has occurred if one minute has elapsed between when the user selection of the first search result was detected and when the second input was detected). In some embodiments the predetermined condition is that a predetermined set of one or more actions have occurred (e.g., the condition has occurred if the user has performed a specified number of inputs in the first application before the second input is detected).

In some embodiments, after ceasing to display the second application and redisplaying the plurality of search results (e.g., 5092-1, 5092-2, 5092-3, 5092-4, 5092-5, 5092-6, 5092-7 in FIG. 5W) on the touch screen display, the device detects (671) a fourth input by the user (e.g., a finger gesture, such as a right-to-left finger swipe gesture or other predefined user action) on the touch screen display in the first area. For example, in FIG. 5W, the device detects a contact 5134 and movement of the contact 5136 (e.g., a right-to-left finger swipe). In response (672) to detecting the fourth input by the user, the device ceases (673) to display the plurality of search results on the touch screen display.

In some embodiments, the device displays an animation of a transition from display of the search user interface with search results to display of the first plurality of application launch icons (e.g., the animation illustrated sequentially in FIGS. 5W, 5X, 5Y and 5A). In some embodiments, the animation comprises sliding the first plurality of application launch icons (e.g., 5002 in FIG. 5X and 5002 and 5004 in FIG. 5Y) onto the touch screen display from a side of the display (e.g., 5036 in FIG. 5X). In some embodiments, the animation comprises (617) sliding the search user interface (e.g., 5037) and any search results (e.g., 5092-1, 5092-2, 5092-3, 5092-4, 5092-5, 5092-6. 5092-7 in FIG. 5X) towards a side of the display (e.g., 5038 in FIG. 5X). In some embodiments, the animation comprises (618) sliding the first plurality of application icons (e.g., 5002, in FIGS. 5X and 5002 in FIG. 5Y) onto the touch screen display from a first side of the display while concurrently sliding the first plurality of application launch icons towards a second side of the display opposite the first side of the display (e.g., as shown in FIGS. 5X and 5Y).

In some embodiments, after detecting the fourth input by the user (e.g., contact 5134 and movement of the contact 5136 in FIG. 5W) the device displays (674) the first plurality of application launch icons (e.g., 5002, 5004, 5006, 5008 in FIG. 5A) in the first area (e.g., 5010 in FIG. 5A) of the touch screen display.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a multifunction device with a touch screen display:
displaying a plurality of application launch icons on the touch screen display;
while displaying the plurality of application launch icons on the touch screen display, detecting a vertical swipe gesture;
in response to detecting the vertical swipe gesture, displaying a search input area and a soft keyboard on the touch screen display;
detecting an input on the soft keyboard associated with one or more search input characters;
in response to detecting the input on the soft keyboard associated with the one or more search input characters:
displaying the one or more search input characters in the search input area on the touch screen display;

performing a search of multiple applications on the device using the one or more search input characters; and displaying a first portion of a list of search results from the search while concurrently displaying the soft keyboard on the touch screen display.

2. The method of claim 1, further comprising:

while displaying the first portion of the list of search results on the touch screen display, detecting a touch gesture on the touch screen display;

in response detecting the touch gesture on the touch screen display while displaying the first portion of the list of search results, replacing the display of the first portion of the list of search results with display of a second portion of the list of search results, wherein the second portion of the list of search results includes at least one search result that is not included in the first portion of the list of search results.

3. The method of claim 1, further comprising:

while displaying the first portion of the list of search results while concurrently displaying the soft keyboard, detecting a touch input in a search command area on the touch screen display;

in response to detecting the touch input in the search command area on the touch screen display:
    ceasing to display the soft keyboard; and
    displaying one or more additional search results beyond the first portion of the list of search results from the search on the touch screen display.

4. The method of claim 1, wherein the list of search results comprises contact information associated with an address book application.

5. The method of claim 1, wherein the list of search results groups one or more subsets of search results by application.

6. The method of claim 1, further comprising:

detecting user selection of a first search result in the first portion of the list of search results displayed on the touch screen display, wherein the first search result corresponds to content associated with a first application;

in response to detecting the user selection of the first search result:
    ceasing to display the first portion of the list of search results,
    activating the first application, and
    displaying information corresponding to the first search result in the corresponding first application.

7. A non-transitory computer readable storage medium storing one or more programs comprising instructions, which when executed by a multifunction device with a touch screen display, cause the device to:

display a plurality of application launch icons on the touch screen display;

while displaying the plurality of application launch icons on the touch screen display, detect a vertical swipe gesture;

in response to detecting the first vertical swipe gesture, display a search input area and a soft keyboard on the touch screen display;

detect an input on the soft keyboard associated with one or more search input characters;

in response to detecting the input on the soft keyboard associated with the one or more search input characters:
    display the one or more search input characters in the search input area on the touch screen display;
    perform a search of multiple applications on the device using the one or more search input characters; and
    display a first portion of a list of search results from the search while concurrently displaying the soft keyboard on the touch screen display.

8. The medium of claim 7, wherein the one or more programs comprise instructions, which when executed by the device, further cause the device to:

while displaying the first portion of the list of search results on the touch screen display, detect a touch gesture on the touch screen display;

in response detecting the touch gesture on the touch screen display while displaying the first portion of the list of search results, replace the display of the first portion of the list of search results with display of a second portion of the list of search results, wherein the second portion of the list of search results includes at least one search result that is not included in the first portion of the list of search results.

9. The medium of claim 7, wherein the one or more programs comprise instructions, which when executed by the device, further cause the device to:

while displaying the first portion of the list of search results while concurrently displaying the soft keyboard, detect a touch input in a search command area on the touch screen display;

in response to detecting the touch input in the search command area on the touch screen display:
    cease to display the soft keyboard; and
    display one or more additional search results beyond the first portion of the list of search results from the search on the touch screen display.

10. The medium of claim 7, wherein the list of search results comprises contact information associated with an address book application.

11. The medium of claim 7, wherein the list of search results groups one or more subsets of search results by application.

12. The medium of claim 7, wherein the one or more programs comprise instructions, which when executed by the device, further cause the device to:

detect user selection of a first search result in the first portion of the list of search results displayed on the touch screen display, wherein the first search result corresponds to content associated with a first application;

in response to detecting the user selection of the first search result:
    cease to display the first portion of the list of search results,
    activate the first application, and
    display information corresponding to the first search result in the corresponding first application.

13. A multifunction device, comprising:

a touch screen display;
one or more processors;
memory; and
one or more programs, including a plurality of applications, wherein the one or more programs are stored in the memory and configured to be executed by the one or more processors, the one or more programs including instructions for:
    displaying a plurality of application launch icons on the touch screen display;
    while displaying the plurality of application launch icons on the touch screen display, detecting a vertical swipe gesture;

in response to detecting the vertical swipe gesture, displaying a search input area and a soft keyboard;
detecting an input on the soft keyboard associated with one or more search input characters;
in response to detecting the input on the soft keyboard associated with the one or more search input characters:
   displaying the one or more search input characters in the search input area on the touch screen display;
   performing a search of multiple applications on the device using the one or more search input characters; and
   displaying a first portion of a list of search results from the search while concurrently displaying the soft keyboard on the touch screen display.

14. The device of claim 13, including instructions for:
while displaying the first portion of the list of search results on the touch screen display, detecting a touch gesture on the touch screen display;
in response detecting the touch gesture on the touch screen display while displaying the first portion of the list of search results, replacing the display of the first portion of the list of search results with display of a second portion of the list of search results,
wherein the second portion of the list of search results includes at least one search result that is not included in the first portion of the list of search results.

15. The device of claim 13, including instructions for:
while displaying the first portion of the list of search results while concurrently displaying the soft keyboard, detecting a touch input in a search command area on the touch screen display;
in response to detecting the touch input in the search command area on the touch screen display:
   ceasing to display the soft keyboard; and
   displaying one or more additional search results beyond the first portion of the list of search results from the search on the touch screen display.

16. The device of claim 13, wherein the list of search results comprises contact information associated with an address book application.

17. The device of claim 13, wherein the list of search results groups one or more subsets of search results by application.

18. The device of claim 13, including instructions for:
detecting user selection of a first search result in the first portion of the list of search results displayed on the touch screen display, wherein the first search result corresponds to content associated with a first application;
in response to detecting the user selection of the first search result:
   ceasing to display the first portion of the list of search results,
   activating the first application, and
   displaying information corresponding to the first search result in the corresponding first application.

* * * * *